April 19, 1966  R. K. REYNOLDS  3,246,405
VEHICLE ATTITUDE CONTROL
Filed Aug. 7, 1961  10 Sheets-Sheet 2
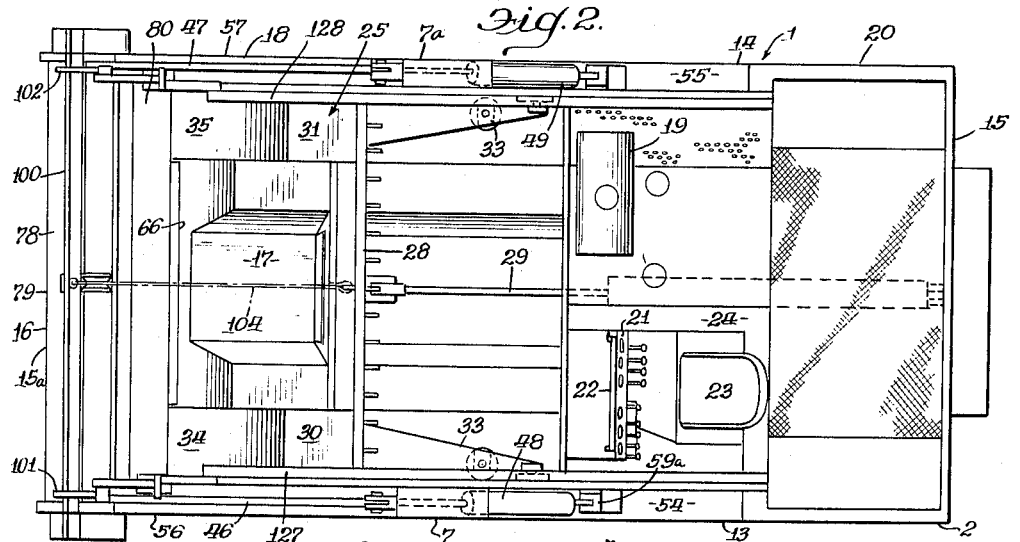
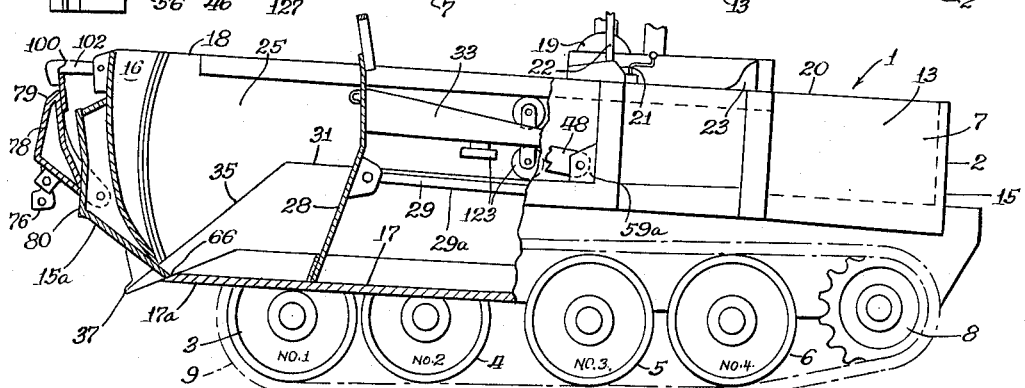
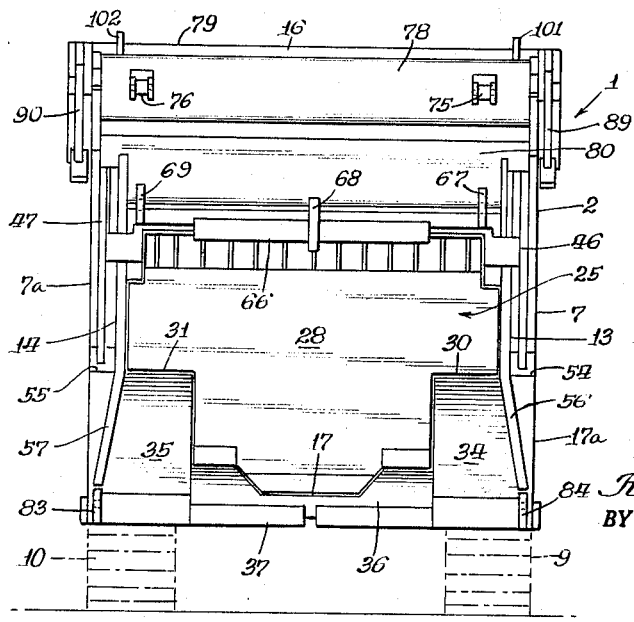
INVENTOR.
Ralph K. Reynolds
BY Paul O. Pippel
Atty.

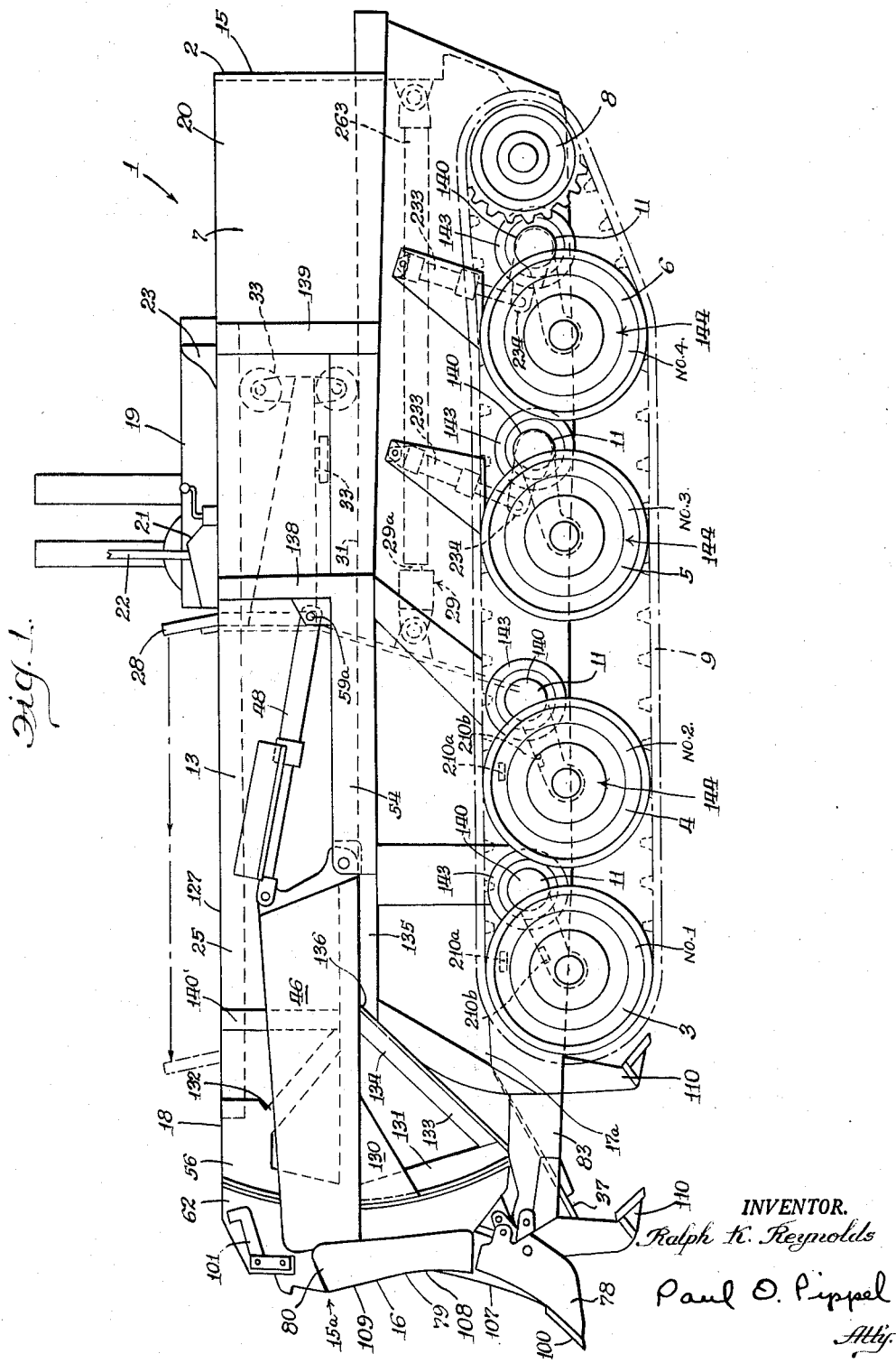

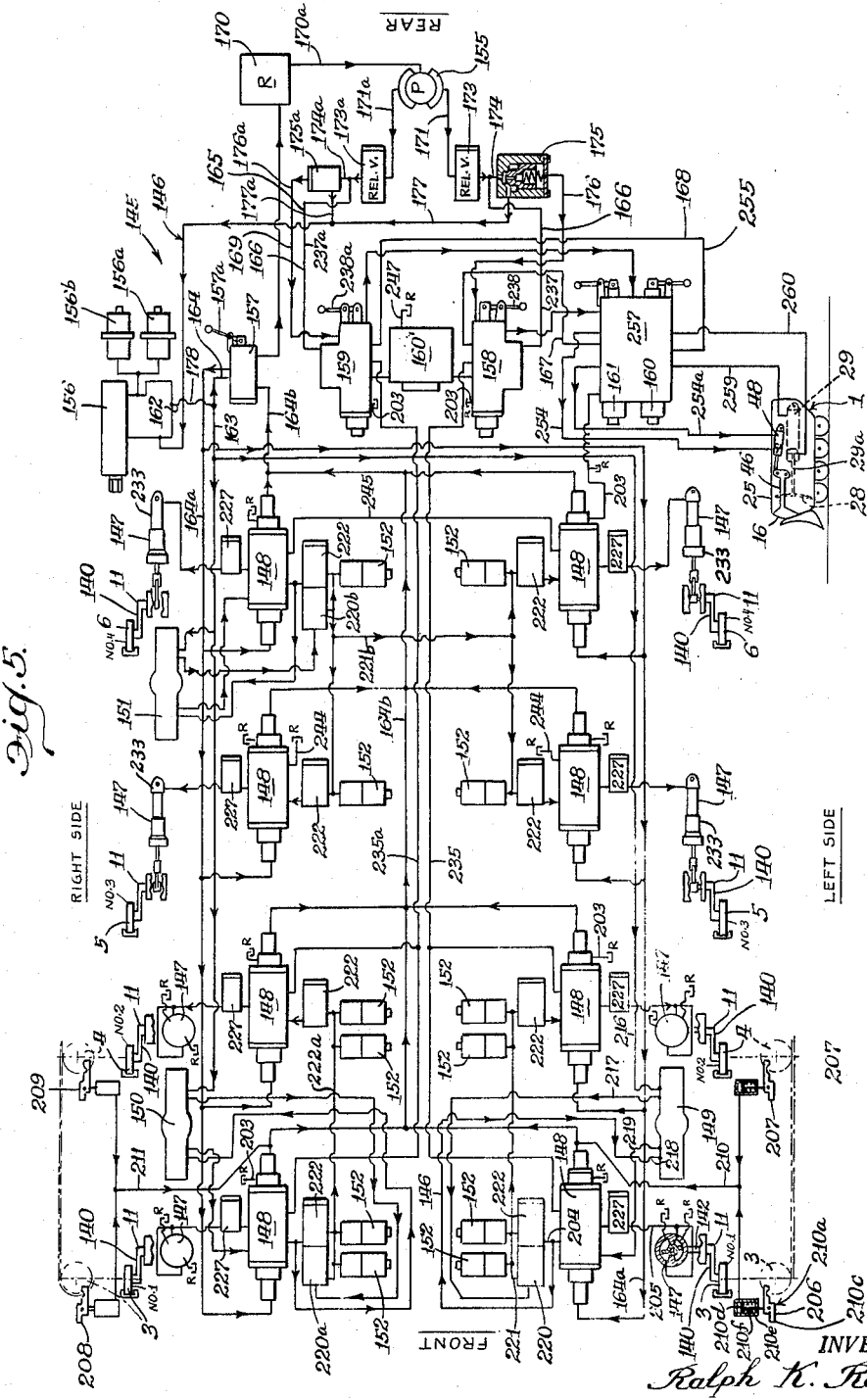

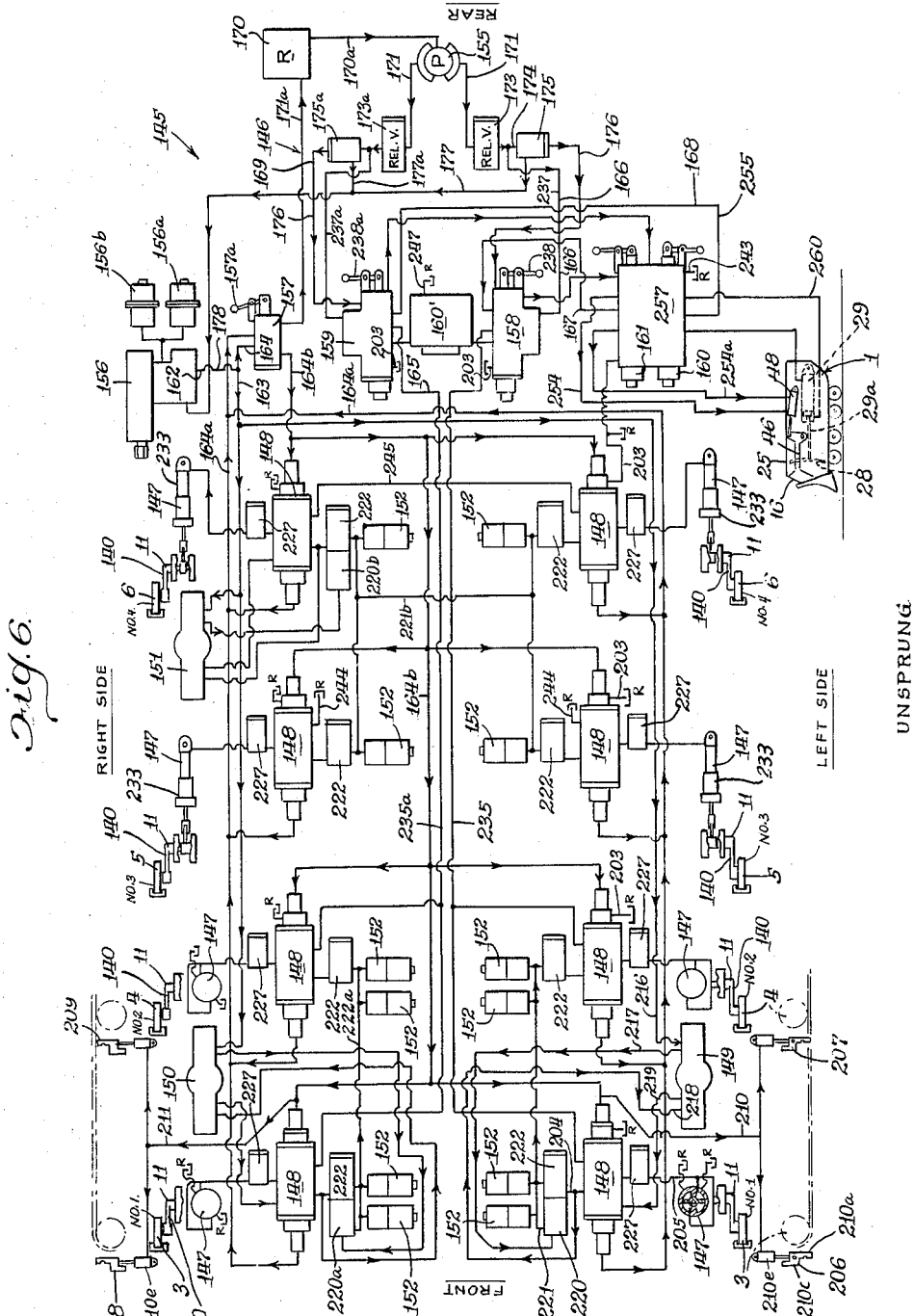

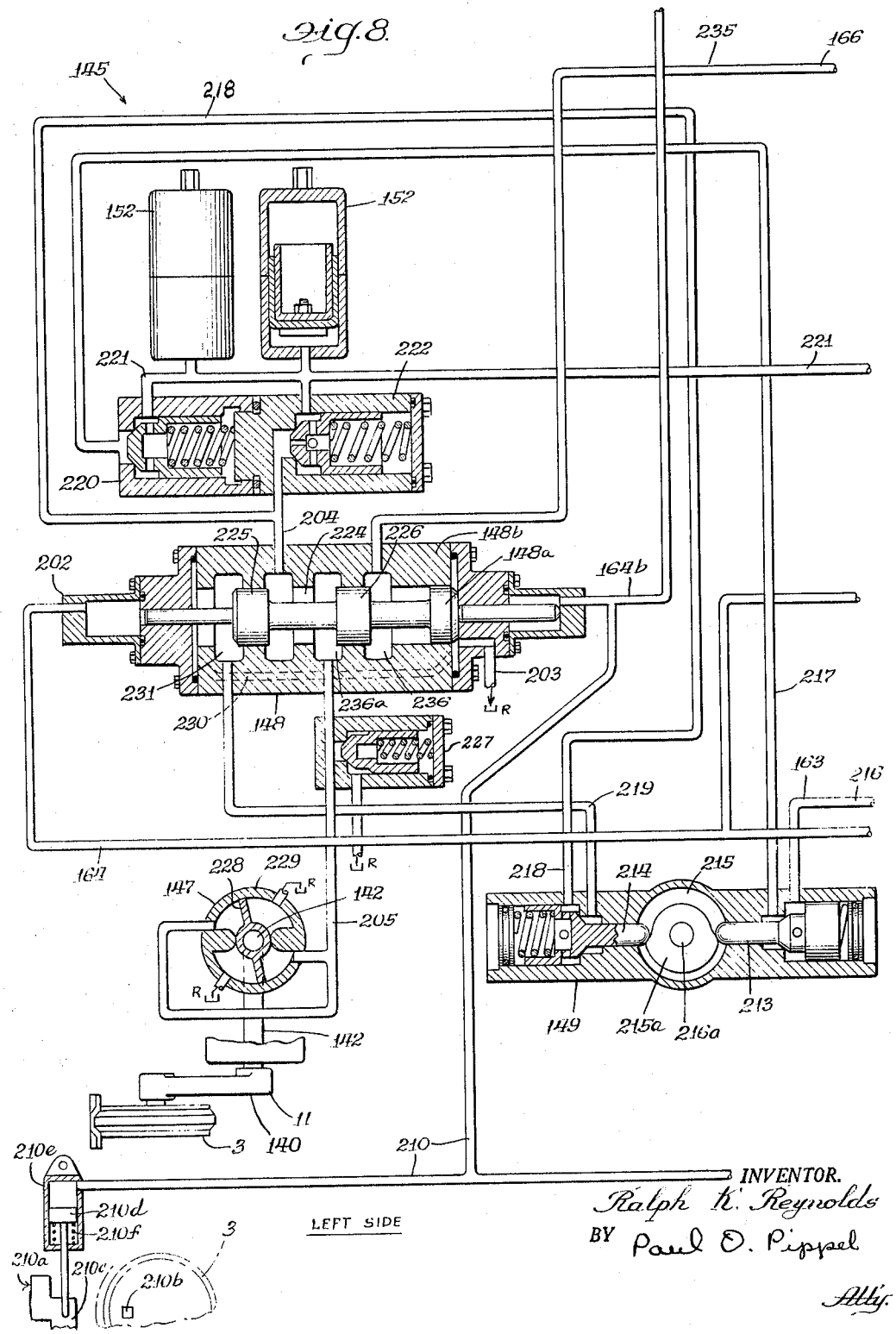

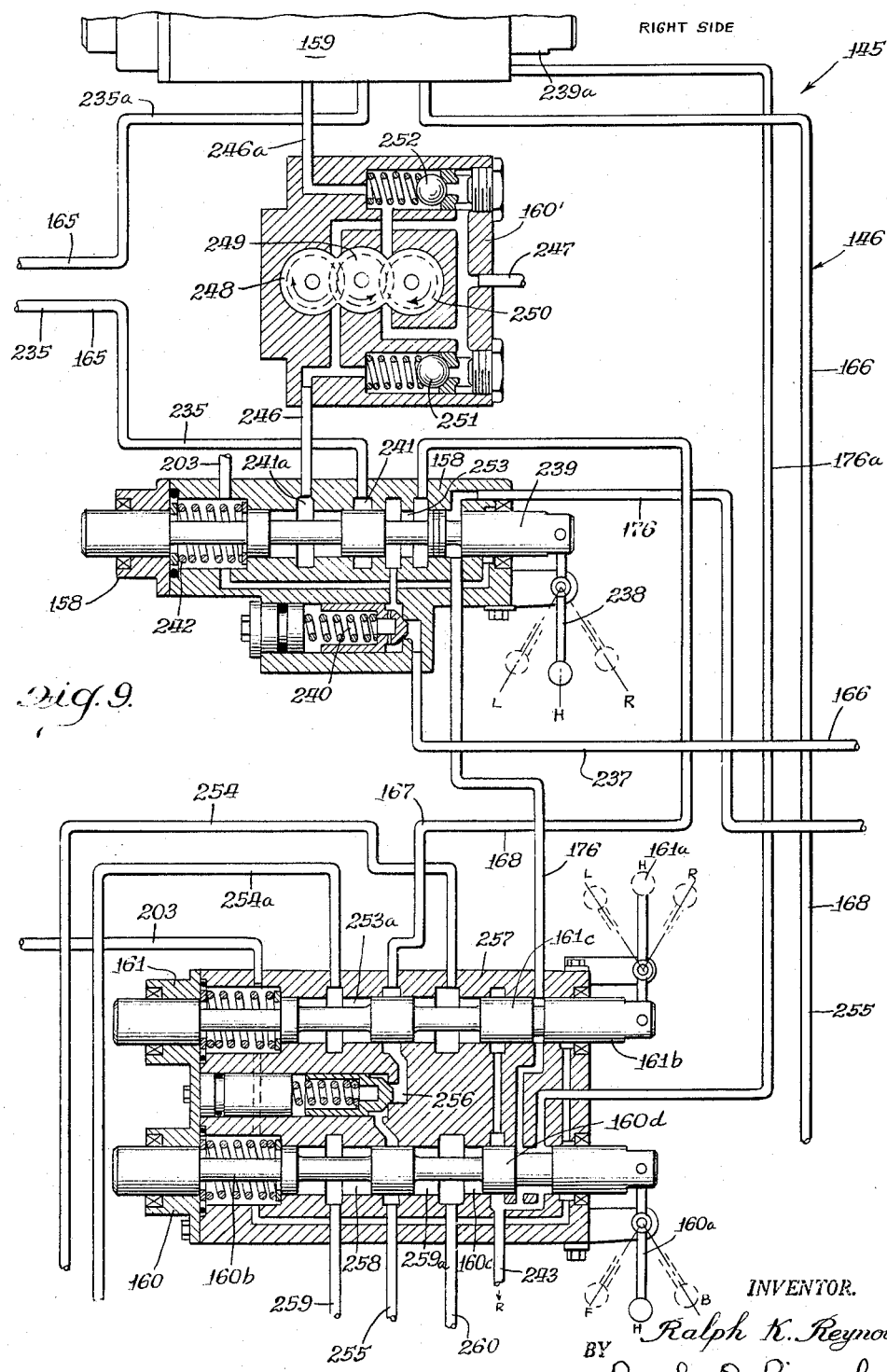

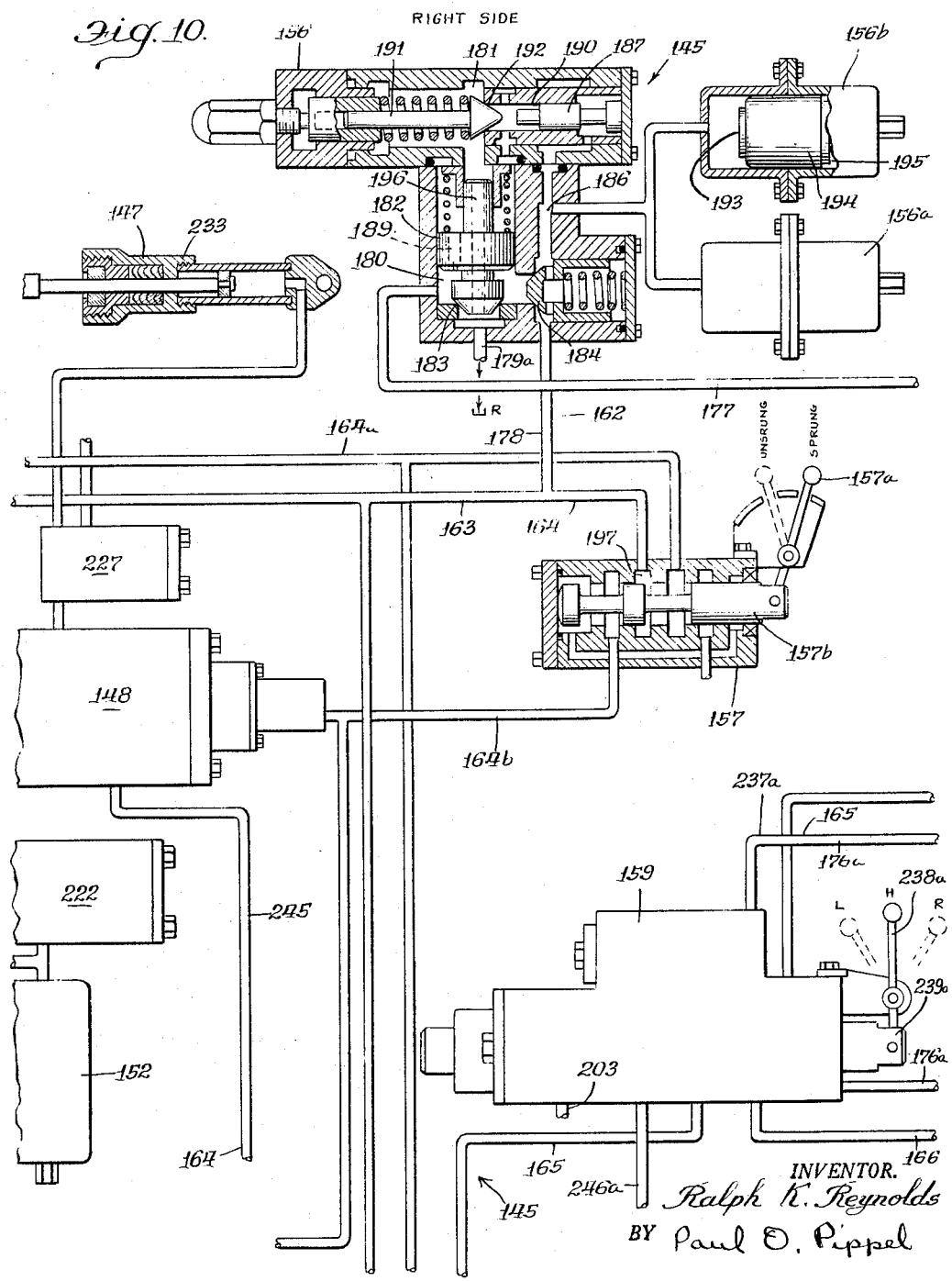

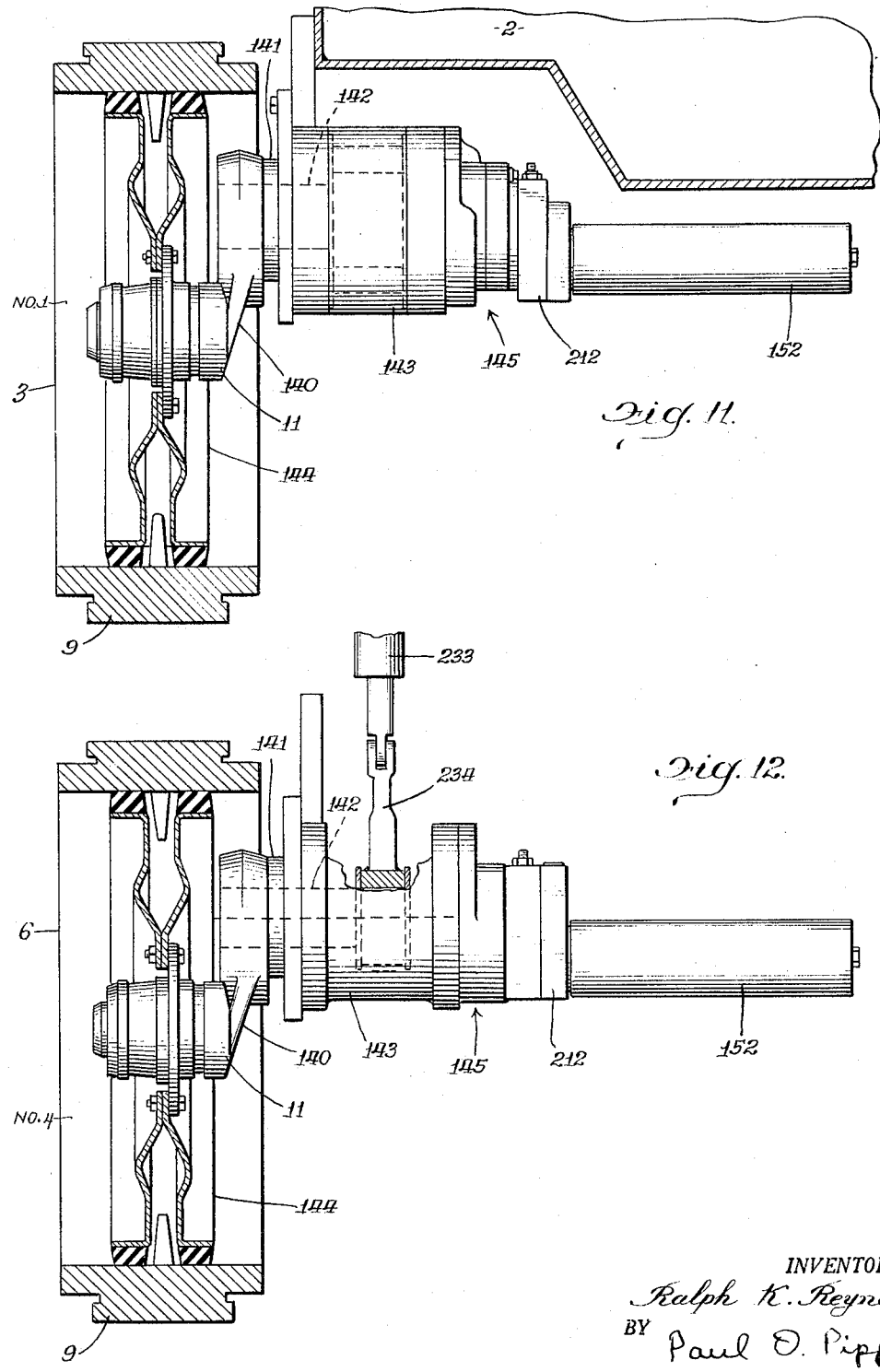

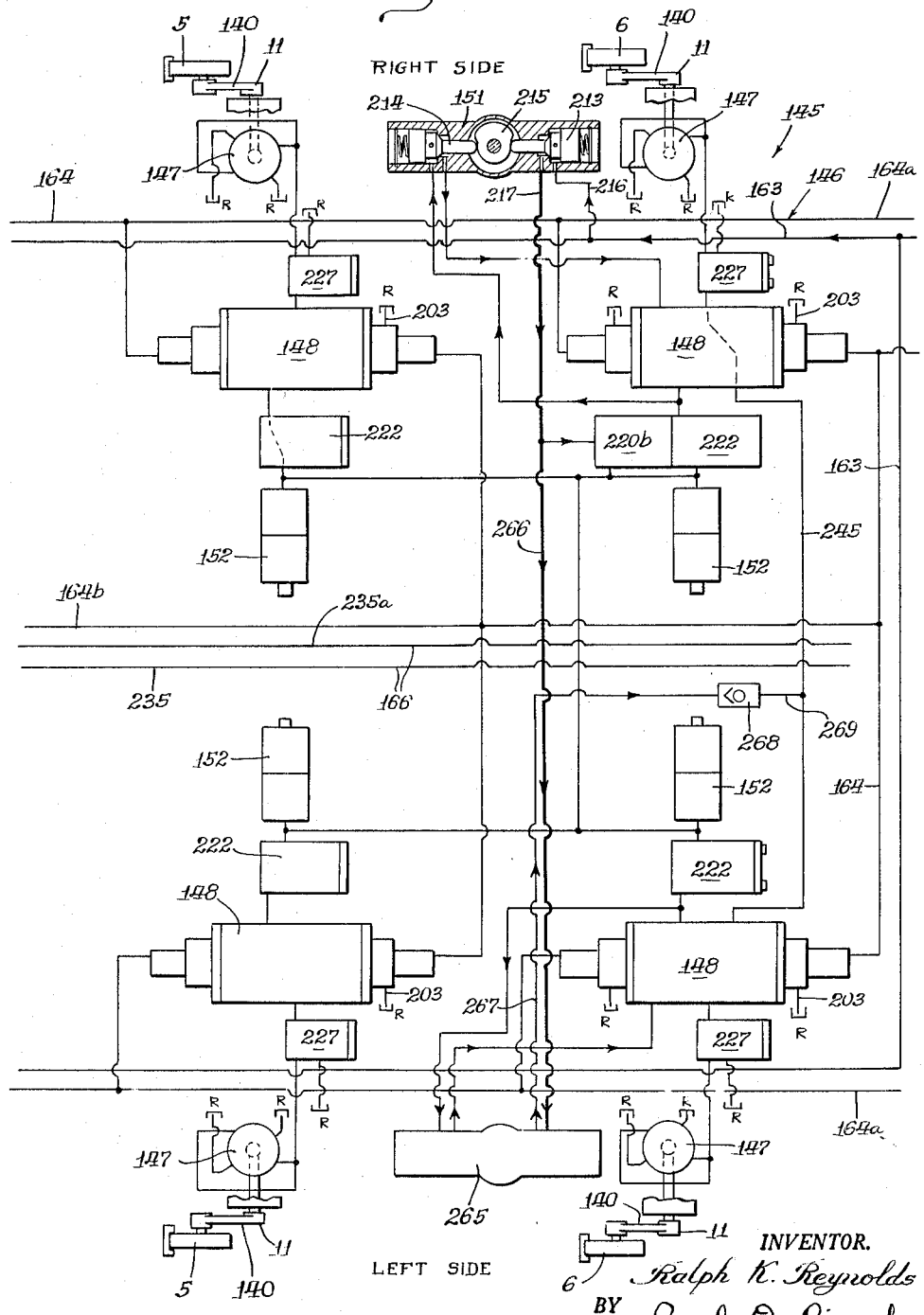

United States Patent Office 3,246,405
Patented Apr. 19, 1966

3,246,405
VEHICLE ATTITUDE CONTROL
Ralph K. Reynolds, Des Plaines, Ill., assignor to International Harvester Company, Chicago, Ill., a corporation of New Jersey
Filed Aug. 7, 1961, Ser. No. 130,237
31 Claims. (Cl. 37—143)

This invention relates to improvements in earthworking vehicles and more in particular relates to vehicles performing earth scraping, loading, and dozing operations.

The earth working vehicle of the type primarily referred to is an endless track vehicle compiising a transversely disposed earth working tool, track engaging and supporting wheel assemblies which are movable up and down with respect to and carried by the vehicle, and mechanism including hydraulic wheel actuators interconnecting each of the wheel assemblies and the vehicle, such hydraulic actuators having a source for supplying liquid pressure thereto.

According to my invention, improved hydraulic control means which are associated with each of the wheel assemblies are selectively operable to provide a yieldable, self-leveling suspension and a rigid unsprung suspension whereby the vehicle and the earth working tool may be pitched or tilted, the hydraulic control means being characterized wherein a plurality of the wheel assemblies each include a first operator control valve, also termed a wheel valve, which is hydraulically connected to the actuator.

More particularly, my improved hydraulic control means comprises first and second hydraulic circuits interconnecting the source and the first valve; accumulator means in the first circuit; leveling valve means in the first circuit between the source and the first valve, the leveling valve means being connected to the wheel assembly and responsive to up and down movements thereof to control fluid flow to and from the first valve; and a second operator control valve, also termed a raise-hold-lower valve, hydraulically connected in the second circuit. The selective operation discussed is provided by the first and second valves, of which the first valve (wheel valve) is selectively positionable between a first position blocking the second circuit and hydraulically interconnecting the first circuit and wheel actuator whereby the wheel actuator is in hydraulic communication with the accumulator and leveling valve means to provide a yieldably sprung, self-leveling suspension, and a second position hydraulically interconnecting the second circuit and the wheel actuator and blocking communication from the accumulator and leveling valve means to the wheel actuator, to provide an unsprung vehicle suspension. The second valve (raise-hold-lower valve) is selectively positionable to control fluid flow between the source and the actuator when the first valve is in the second position, to thereby control selective pitching and tilting of the vehicle and the earth working tool.

A specific object of this invention is the provision of a hydro-pneumatic, actuator type suspension for an earthwo;thing vehicle, whe:ein the pneumatic phase affords a cushioning action to the vertical movement of actuators controlled by the hydraulic system, and wherein the hydraulic system affords control over the actuators so that the suspensions keep the vehicle cushioned and level to the ground, or so that cushioning and leveling are prevented and the vehicle assumes any rigid attitude desired on its suspensions.

It is a further object to provide an earthworking vehicle of the crawler tractor type having a scraper bowl integral therewith, the scraper bowl having an earth-cutting edge which may be raised, lowered, or tilted relative to the ground.

Another object is to provide an earthworking vehicle of the crawler type having a dozer assembly releasably rigidly attached thereto and movable in accordance with change in the attitude of the vehicle relative to the vehicles ground traversing members.

A further object of this invention is to provide a vehicle which may be driven at high speed in a sprung or free floating position at relatively high speeds or may be in an unsprung or rigid position at relatively lower speeds.

Another object is the provision, in a vehicle suspension having a main circuit interconnecting a fluid source and certain suspension actuators for resisting vertical movement with a cushioning action and applying a restoring force, of a single sprung-unsprung valve and valving controlled thereby and positionable in the main circuit in a position for selectively interrupting the cushioning action, and raise-hold-lower valves connected in the main circuit and operative, when the cushioning action has been interrupted due to positioning of the sprung-unsprung valve, for selectively locking the actuators against vertical movement or inducing vertical movement of the actuators by directing fluid flow thereto from the fluid source.

It is another object of this invention to provide an earthworking vehicle which is capable of having its body frame pivoted transversely and longitudinally about its rear portion relative to the ground.

These and other objects will become apparent from reference to the following drawings and descriptions which portray an operable arrangement of the novel device without placing any limitation on the breadth or scope of the appended claims, wherein:

FIGURE 1 is a side elevational view of the novel and inventive earthworking vehicle;

FIGURE 2 is a plan view of the earthworking vehicle;

FIGURE 3 is a side elevational view of the vehicle partly in section to illustrate the scraper bowl interior and the attached apron dozer unit;

FIGURE 4 is a front elevational view of the vehicle with the scraper bowl open and the apron dozer unit in the raised position;

FIGURE 5 is a schematic plan view of the novel hydraulic system of the vehicle in sprung suspension;

FIGURE 6 is a schematic plan view of the novel hydraulic system of the vehicle in unsprung or rigid suspension;

FIGURE 8 is an enlarged sectional view illustrating the wheel accumulators, the wheel valves, the leveling valves and the hydraulic means for raising and lowering the wheels relative to the tractor body shown in FIGURES 5, 6 or 7;

FIGURE 9 is a further enlarged sectional view illustrating the various valves for raising, lowering and tilting of the vehicle shown in FIGURES 5, 6 or 7;

FIGURE 10 is a further enlarged sectional view illustrating the centralized accumulator means and sprung and unsprung valves for controlling the suspension leveling and rigidification of the vehicle with respect to its ground traversing members shown in FIGURES 5, 6 or 7;

FIGURE 11 is a view partially in section showing portions of the connection between the right front tractor wheel and axle assembly and the means for moving said wheel relative to the body of the vehicle;

FIGURE 12 is a view partially in section illustrating the physical relation between the right rear wheel and assembly and the means for moving said wheel and axle assembly relative to the body of the vehicle; and FIGURE 13 is a partial schematic plan view of the hydraulic system in modified form showing a rear pair of leveling valves.

Figure 7:
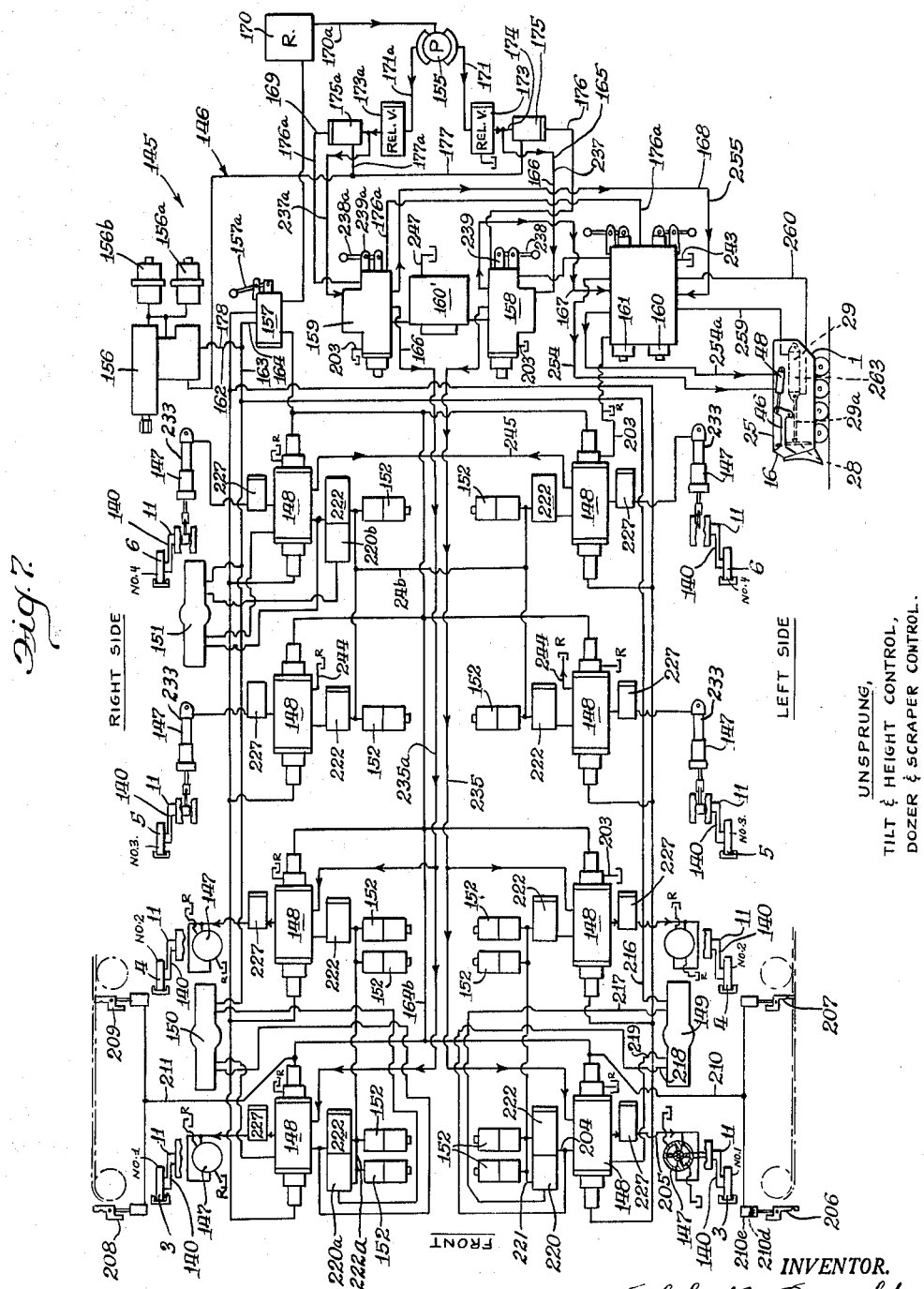
FIGURE 7 is a schematic plan view of the novel hydraulic system employed on the earthworking vehicle for raising, lowering, and tilting same relative to the ground in unsprung suspension.

With reference to the disclosures of my co-pending U.S. Patents No. 3,092,919, No. 3,104,480, and No. 3,175,312, and to the accompanying drawings particularly FIGURES 1 through 4, there is shown a vehicle 1 of the crawler tractor type having a body 2 and a plurality of ground traversing members or wheels 3, 4, 5 and 6 on either side (left or right) 7, 7a of the vehicle 1. The members 3, 4, 5, and 6 are driven by a pair of sprockets 8 disposed one at each rear side of the vehicle, the members on one side of the vehicle being encircled by track 9 and the members on the other side of the vehicle being encircled by the track 10. Each of the wheel members 3, 4, 5, and 6 is mounted for rotation on a wheel bearing spindle at the end of an interconnecting linkage on arm mechanism 11, the mounting means moving with the rotating wheel members in a generally vertical direction with respect to the body 2. The body 2 consists of a rectangular framework having panel sides 13, 14, a rear 15, and a front 15a including a forwardly disposed facing or movable side 16 and a bottom or lower portion 17a at the front part 18 of the vehicle or tractor.

It is to be noted that such expressions as front end or part or rear end or part is merely chosen to provide a geographic location and it will be understood that this expression is intended to merely cover the operating end of the vehicle regardless of the direction in which the vehicle is traveling.

The engine designated as 19 is located in the rearward portion 20 of the tractor 1 as are located all of the controls for operating the vehicle 1. Alongside of the engine structure 19 all of which are located on platform 24 are the hydraulic controls 21, the operator's seat 23 and windshield 22.

Forward of the platform 24 is a scraper bowl 25 formed by side members 13, 14, the forward movable wall or apron 16, the floor 17 and the forward end of the platform 24. Reciprocal between the apron 16 and the platform within the bowl 25 is the movable ejector gate 28 having a hydraulically operated ram unit 29 for ejecting loads from the bowl 25. Sponsons or ejector guide tracks 30, 31 are flanked along each of the side walls 13, 14 over which pass extensions and rollers 33 of the ejector 28 inside bowl 25 guiding the movement of gate 28, the sponsons 30, 31 having forwardly downwardly extending structures or ramps 34, 35 joining with the bowl floor 17 to form a scraper bowl cutting edge 37 beyond the front wall 16.

The scraper bowl 25 at the front end 18 of the tractor 1 is integral with the body framework or housing 2 so that when the body 2 is moved or tilted relative to the wheels by the hydraulically operated linkage 11 between the wheels and the body, the scraper edge 37 is also moved or tilted relative to the ground to cut the earth and fill the bowl 25 in accordance with the dictates of the operator. The bowl 25 is so constructed that the sponson-ramp structures 30–34, 31–35 act as fenders to protect the endless tracks 9, 10 from becoming damaged or having their movement interfered with by the earthen load spilling into the bowl as the tractor moves forward in its loading operation when the apron 16 is in the raised position.

The scraper edge surface formed by the sponson-ramps 30–34, 31–35 and the bowl floor 17 merge to form the cutting edge 37 to present a full width scraping edge 37 and the dirt or load entering the bowl simultaneously rises up the slope end 36 of the bowl 25 and the ramps, some of the dirt entering the lower bowl area and the rest of the dirt going on the sponsons and falling off into the lower bowl area in a swirling action and the dirt or load is retained therein by lowering the apron 16 to the down position.

The apron unit 16 is attached to the front end of the tractor 1 by the pair of extensions or arms 46, 47 on either side of the bowl of the vehicle 1 which extensions 46, 47 are pivotally connected to hydraulic ram units 48, 49 pivoted to the generally horizontal ledges 54, 55. This permits the scraper apron unit to be swung vertically in an arcuate path around the forward end of the side members 13, 14. In the lowered position the rearward or inwardly facing concave surface of the apron unit 16 forms a frontal wall or bowl closure for the bowl 25 for holding a load therein and swinging of the apron from the lowered position upwardly permits entrance of a load into the bowl when the tractor is performing scraping operations or the like up to a maximum raised position. The inside concave faces of the apron 16 have a contour which conforms to and complements the contour of each of the outward facing convex surfaces of the side members 16, 17 and the bottom or apron edge 66 of the frontal wall 16 lies adjacent or next to the ramps 34, 35 and the sloping portion of the floor 17. The weight of the apron 16 actually rests against the downward sloping surfaces of the bowl just rearward of the scraper edge 66 through the abutment 67, 68 and 69 integral with the lower portion of the apron 16, the outer abutments 67, 69 having holes registering with yoke extentions 75, 76 on the rearward side of the lower or depending part 78 of the dozer portion unit 79 for holding the depending part 78 fixed to the apron part 80 of dozer unit 79 for dozing operation. The dozer apron element 16 is similarly keyed to extensions 83, 84 on the side of the side members 13, 14 registering with extensions 89, 90 of the depending dozer element 78 and consequently when the tractor is moving forward in the dozing position all loads are transmitted to the sides of the bowl via the dozer depending element 78 through the apron 16 thus preventing the apron from being pressed against the side members 13, 14 avoiding damage to the apron such that its inner surfaces could bind against the surfaces of the side members 13, 14 preventing relative vertical swinging movement between the apron and the side members. Also by so locking the dozer to the truss members 56, 57 of the side members a shock load can be withstood.

The outward facing part 80 of the apron 16 of the scraper unit 25 carries the said swingable member or dozer portion 78 for vertically swingable movement from a lowered or dozing position wherein the dozer blade edge 100 is down to a raised position wherein the outwardly extending dozer blade edge 100 may be locked against the outward side of the upper portion 80 of the apron unit 16 by catches 101, 102 attached to the top side of the apron 16. The dozer blade portion 78 may be swung from its lowered position to its raised position by cable 104 attached to the middle portion of the dozer edge 100 and the central portion of the forward facing surface of the ejector gate 28, the cable 104 causing movement of the dozer blade portion 78 in accordance with the movement of the ejector gate. It will be noticed that the depending portion or dozer part of the apron 16 has an outwardly facing concave surface 107 which when placed in a lowered position forms one continuous concave surface 108 with the outer facing concave surface 109 of the outward upward portion 80 of the apron unit 16 thus forming a moldboard or dozing surface.

Scarifying teeth 110 on the tractor 1 are positionable to cut or scarify the ground as the tractor moves in a reversed direction in a conventional manner.

When the dozer portion 78 is raised so that its concave surface lies up against the upper outside forwardly facing surface of the apron unit 16 in its locked position, the apron is duly strengthened by the thickness of the dozer portion 78 and the thick portion of the apron unit 16 to act as a work hammer.

The design of this tractor 1 permits its scraper element 25 to scrape the full width of the tractor 1 and the sponson-ramp portions 30–34, 31–35 in combination with the bed 17 of the bowl 25 permit the entire forward portion of the tractor 1 to act as a load storing bowl and yet to protect the endless tracks 9, 10 from being damaged by the load entering the bowl 25. When the bowl 25 is filled with material in ballast fashion it increases the load working dozing capacity of the tractor 1 and the forward wall or apron 16 of the tractor 1 serves the dual purpose of enclosing the bowl 25, aiding the bowl in being filled by gradual adjustment of the apron opening, and the apron member 16 also serves as a dozer blade for pushing loads when the bowl 25 is closed and in the out-of-use position when the operator wishes to perform scraping operation or unload the bowl by ejecting the load with the ejector gate 28 which can raise and lower the dozer blade portion 78 into out-of-use positions and the dozer apron structure 16 may be used in hammer-like fashion to strike at loads such as knocking over trees and the like.

It will be noted that each side member 7 or 7a comprises a substantially vertical panel 13 or 14 which at its forward end vertically broadens into the truss element 56 or 57 in the form of an enlarged track covering structure and which includes as a means of reinforcement a truss embossment 130 on its exterior side. The truss embossment 130 has a forwardly bowl compression member 131 which merges into the upper and lower extremities of the forwardly diverging truss struts 132, 133 of the tension member 134 of the embossment 130, the rear or inner end of the truss struts 132, 133 merging into a substantially horizontal column member 135 intermediate its ends extending rearwardly from the apex 136 of the truss embossment 130 over the sponson-ramps or fender structure 30–34 or 31–35 which projects laterally and outwardly of the side member 13 or 14. The rear end of the column 135 extends into the forward end of the fore and aft extending box section main beam or horizontal ledge 54 or 55 growing wider rearwardly and merging on its top side with the upright gusset column 138 and at its rear end with the upright gusset column 139. The forward end of the ledge 54 or 55 provides a pivotal connection for the lower rear corner of the boom 46 or 47 which is substantially triangularly shaped in side elevation and has a pivotal connection at its upper rear corner to one end of a ram 48 or 48 extending diagonally downwardly and rearwardly and having a rear end connected to the ear structure 59a which is forward in a corner which develops between the main beam 54 or 55 and the gusset post 138. The side wall front end portion is also provided with a vertical stiffening rib 140' which extends from the apex 136 of the truss structure 56 or 57 to the upper edge 127 or 128 of the side 7 or 7a.

The forward end of the boom 46 or 47 joins with the combination dozer apron unit 16 being provided with a rearward facing wear rail 62 which could be subjected to sufficient deflection and may react against the forward edge of the compression member 131. However, any load against the outward side of the dozer apron unit 16 is transmitted to the locking extensions of the upper part 80 of the apron 16 and the dozer depending portion 78, respectively, to the extensions integral with and depending from the truss embossment 130 which serves to take up the brunt of the load. Also external loads against the outward side of the apron 16 are transmitted through the boom 46 or 47 to the side 13 or 14 of the vehicle 1 before deflection of the wear rail can occur.

As previously mentioned each of the wheels 3, 4, 5 or 6 of the vehicle are pivotally attached to the tractor 1 for relative movement of the wheels with respect to the frame 2. This is accomplished by the wheel arm 140 of each of the wheels 3, 4, 5 or 6 being affixed to the sleeve 141 for relative rotation therewith, said sleeve being rotatable about axle shaft 142 journalled in the axle housing 143 integral with the tractor frame 2. Each of the 8 wheel and axle assemblies 144 are capable of independent vertical movement with respect to one another through the introduction of a unique vehicular articulating means or mechanism 145 employing a dual hydraulic system 146 to be hereinafter explained which mechanism permits the tractor to be in sprung suspension for high speed travel and to be in unsprung or rigid suspension which is capable of controlling the attitude of the vehicle relative to the wheel and to the ground through height and tilt of the vehicle for effective operation of earth scraping and dozing, scarifying, etc., at relatively lower vehicular speeds.

For accomplishing the attitude control the mechanism 145 comprises a hydraulic actuator 147 for each of the wheels, a wheel valve 148, for each of the wheels, three leveling valves 149, 150 and 151, one leveling valve 149 being located between the No. 1 and No. 2 wheels on the left side, the second leveling valve 150 being between the No. 1 and No. 2 wheels on the right side, and the third leveling valve 151 being between the No. 3 and No. 4 wheels on the right side of the vehicle; a pair of wheel accumulators 152 for each No. 1 and No. 2 wheels on both the right and left side of the vehicle and a single accumulator 152 for each of the No. 3 and No. 4 wheels both on the right and left sides; a hydraulic pump 155; two centralized accumulators 156a, 156b and a pressure regulating unit 156; a sprung-unsprung hand valve 157 having a unilever type control level 157a; a pair of wheel control valves 158, 159 and metering gears 160' being connected therebetween, the valves 158, 159 being effective for raising and lowering the No. 1 and No. 2 wheels on the left and right side of the vehicle; and a control ejector valve 160 and a control apron valve 161 for operation of the ejector 28 and apron 16 respectively; said mechanism 145 employing the dual hydraulic system 146 including (1) the centralized system 162 having a leveling circuit 163 and a wheel valve circuit 164, and (2) the hydraulic unit system 165 including a wheel control valve circuit 166, an apron control valve circuit 167, and an ejector control valve circuit 168, the centralized system 162 being isolated for operation of the hydraulic unit system 165 by closing off the free flow of the pilot line system 169 having branch circuits 176, 176a to the reservoir 170 by manipulation of one of the control valves 158, 159, 160 or 161.

Dual condition suspension

An understanding of the construction and operation of this duel hydraulic system 146 can be readily appreciated with reference to the drawings and particularly FIGURES 5 through 13 in conjunction with the following description:

FIGURE 5 illustrates the hydraulic circuitry and the path of the hydraulic fluid therethrough when the vehicle 1 is in the sprung condition for traveling at high speeds wherein the pump 155 drawing its hydraulic fluid from the reservoir 170 by line 170a and sending one-half of the fluid through one branch 171 and the other half of the fluid through branch 171a, each of the branches 171, 171a handling for descriptive purposes 12½ gallons of hydraulic fluid under pressure. The fluid flowing through branch 171 through the pressure relief valve 173 which is constructed in a conventional manner to not let the pump pressure exceed a value of 6000 p.s.i. whence the fluid passes through line 174 to pilot line check valve 175 to pilot line 176 whose function is to be explained later and which dumps into the reservoir 170, the vast majority of the fluid passing from line 174 through check valve 175 and line 177 which is of much greater diameter than the pilot line 176 as the check valve 175 is opened to permit this. The fluid continues down line 177 to the pressure regulating valve mechanism 156. Similarly the other 12½ gallons of fluid from the pump 155 passing through line 171a also passes through a relief valve 173a having the same function as relief valve 173 through line 174a and the open check valve 175a by line 177a leading from it and joins line 177 to the pressure regulating valve 156, but if check valve 175a is closed then through circuit 166 as later explained.

The pressure regulator 156 is of conventional construction and has fluid communication with the centralized accumulators 156a and 156b such as to maintain a fluid pressure of between 2300 and 2700 p.s.i. The centralized system 162 begins with line 178 exiting from the pressure regulator 156. The pressure regulating valve mechanism consists of a housing having two main chambers 180 and 181. Fluid from the pump 155 enters into chamber 180 from line 177 and passes to the spring loaded main regulator valve 182 which is seated against seat 183 permitting the fluid in chamber 180 to unseat oneway check valve 184 allowing the fluid to go through passage 186 into each of the centralized accumulators 156a and 156b. A spring loaded pilot valve 191 controls the main valve 182. Raising of the pilot valve 191 from its seat 192, due to an unseating force from a free piston 187, causes opening of the main valve 182 which in turn causes the check valve 184 to close. More specifically, the pilot valve 192 when it opens initiates flow so as to create a pressure drop, the valve bleeding the chamber 180 in a drain path including the chamber 180, an orifice 189 in the main valve 182, the space between the pilot valve seat 192 and one side 190 of the free piston 187, chamber 181 adjacent the mouth of the valve seat 192, a longitudinal passage channel 196 in the main valve 182, the opening in the valve seat 183, the conduit 179a, and the reservoir R.

Flow from the chamber 180 tthrough the orifice 189 in the main valve 182 creates a pressure differential across the valve, causing the valve to move away from its seat 183, in a direction overcoming the valve loading spring and connecting the chamber 180 directly to drain into the reservoir. The resulting loss of pressure in the chamber 180 causes the check valve 184 to close and maintain pressure in the pressure 186 and in the system 162.

Normally, however, the pilot valve loading spring keeps the pilot valve 191 against seat 192. This condition is maintained until the pressure in the centralized accumulators exceeds a predetermined value, say of 2700 p.s.i. This occurs because each of the centralized accumulators shown in FIGURE 10 has the fluid from the pump acting on the side 193 of a free piston 194 within each centralized accumulator 156a, 156b, the free piston 194 acting against a predetermined amount of hydrogen gas on the other side 195 of a free piston 194 within each accumulator and the gas is compressed until its pressure reaches a value of 2700 p.s.i. Once this pressure is reached the valve mechanism in the pressure regulating valve is actuated in the following manner. As the pressure builds up to 2700 p.s.i. for the centralized accumulator circuit 162 this pressure overcomes the pressure in the chamber 181 permitting movement of free piston 187 against the head of the valve stem 191 because of the particular construction of the valve components in a known manner forcing the valve stem to unseat the valve stem 191 allowing the fluid on side 190 of the free piston 187 in the chamber 181 to spill through passage channel 196 in the valve stem 182 and back to the reservoir 170 as indicated by the arrow and the letter R. To reduce the number of lines back to the reservoir 170 an arrow having the letter R alongside it indicates that the fluid is dumped back to the reservoir 170. Thus the centralized system is maintained at the pressure of 2700 p.s.i. Should the pressure in the system fall below 2300 p.s.i. for one reason or another, because of the construction of the pressure regulating mechanism the valve stem 191 will seat once again and the pressure will build back up to 2700 p.s.i.

The pressurized fluid is introduced into the centralized system 162 by line 178 passes to the leveling circuit 163 and the wheel valve circuit 164. Following the flow of the pressurized fluid along the wheel valve circuit 164 it is seen that the fluid flows into the chamber 197 of the sprung-unsprung valve 150. It is of conventional construction, being a hand valve as indicated, and arranged with the control lever 157a attached to the outer end of the valve stem 157b, the lever and valve stem being shown in the sprung position in FIGURE 10. This permits the fluid to pass through the valve 157 and out through the wheel valve sprung pressure circuit 164a of wheel centralized circuit 164 into the end 202 of each wheel valve 148 moving each wheel valve stem 148a in the wheel valve housing 148b to its extreme right side position as seen in FIGURE 8. The hydraulic pressure holds the valve spool or stem 148a in this position until the sprung-unsprung valve 157 has its lever 157a moved from the sprung to the unsprung position.

The valve stem 148a takes a second operating position, not shown, when move to the extreme left from that shown in FIGURE 8. The wheel valve 148 is of the conventional type and has its seven lines or circuits communicating its housing 148b with its wheel accumulator, its wheel actuator, the wheel control circuit 164, the pressure circuit 164a and drain circuit 164b of the wheel valve circuit 164 and sprung-unsprung valve 157 communicating with the pressure regulator unit 156 and reservoir 170, its leveling valve, and the leveling valve drain line 203 to reservoir 170. Thus it is seen that line or circuit 164b is a drain to reservoir by way of the sprung-unsprung valve 157 and wheel valve lines 204 and 205 in the sprung position allow fluid communication between the wheel accumulator 152 and the wheel actuator 147.

*Springing condition of suspension*

It will be noted that there is a wheel valve 148 for each of the eight wheels 3, 4, 5 and 6. It is important that each wheel valve 148 is so positioned in the sprung position to permit communication of fluid between each wheel accumulator 152 and each hydraulic wheel actuator 147.

It will be noted that upstop devices 206, 207 and 208, 209 are provided for the left No. 1 and No. 2 wheels 3 and 4 and the right No. 1 and No. 2 wheels 3 and 4 and have fluid lines 210 and 211 for left and right upstops 206, 207, 208, 209 respectively that communicate with the drain line or circuit 164b adjacent the No. 1 and No. 2 wheel valves in the sprung position. The purpose of these upstops will be explained later.

*Automatic leveling*

The leveling valve circuit 163 permits communication of the fluid from the centralized accumulator circuit 162 with the three leveling valves 149, 150 and 151 whence the fluid flows to each wheel accumulator 152 and to each hydraulic actuator 147 by way of each wheel valve 148 in the sprung position of valve 157. Thus the path of the fluid from the pressure regulator 156 is through the leveling valve circuit 163 into leveling valve 151 between Nos. 3 and 4 right side wheels for supplying fluid pressure to the Nos. 3 and 4 wheel accumulators on both the right and left sides of the vehicle 1, and into leveling valve 150 between No. 1 and No. 2 wheels on the right side of the vehicle 1 for supplying fluid to the No. 1 and No. 2 wheel accumulators on the right side and into leveling valve 149 between Nos. 1 and 2 wheels on the left side for supplying fluid to the wheel accumulators of No. 1 and No. 2 wheels on the left side. Each of the three leveling valves 149, 150 and 151 are constructed alike and operate in a like manner and therefore an explanation of the leveling valve connected to the No. 1 wheel on the left side will suffice for the other leveling valves. The No. 1 leveling valve 149 on the left side is mounted about the wheel axle within the container or hydropneumatic package 212 of the mechanism 145 as seen in FIGURE 8. The valve or leveling device 149 carries therein a pair of opposed valve free piston members 213, 214 engageable with a cam 215a housed within the annular opening 215 within the leveling device 149 and being rotatable therein by cam shaft 216a affixed thereto, the cam shaft being integral with the shaft 142 for rotation therewith. The axle shaft 142, the shaft 216a, and the cam 215a form a motion-transmitting connection from the wheel and mechanism 145, and from the hydraulic actuator 147 to the leveling valve 149, such that, as the wheel 3 moves up and the vehicle 1 down, the cam 215 moves counterclockwise opening valve piston 213 and permitting the fluid in line 216 from the leveling circuit 163 of the centralized accumulator system 162 to flow through the right part of valve 149 and out through line 217 toward the wheel accumulator 152 and the wheel valve 148. On the other hand when the wheel moves down the cam 215 moves clockwise and the vehicle moves upward causing valve piston 214 to open and direct the flow of fluid from line 218 communicating with wheel accumulator 152 and wheel valve 148 into the left part of the leveling device 149 and out through line 219 for discharge of the fluid to the reservoir 170 by way of wheel valve 148.

Fluid in the line 217 leading from the leveling valve 149 and containing fluid from the pressure regulator unit 156 passes through surge means comprising a shock load and replenishing check valve 220 which permits the fluid to flow only in the direction toward the wheel accumulator 152. This non-return flow arrangement has the result of preventing back up pressures from the wheel or the hydraulic actuator 147 being sent back to the regulator unit 156 and the centralized accumulators 156a, 156b and thereby prevent damage to the centralized accumulators 156a, 156b. There are only three such check valves 220, 220a and 220b between each of the leveling valves 149, 150 and 151 and the wheel accumulators 152 and actuators 147. The line 221 leading from the check valve 220 not only supplies fluid to the accumulators 152 and wheel valve 148 for the No. 1 wheel left side but also for the wheel accumulators 152 and valve 148 for the No. 2 wheel on the left side. This same condition also holds for wheels Nos. 1 and 2 on the right side of the vehicle, however, line 221b leading from the leveling valve 151 on the No. 4 wheel 6 supplied by way of check valve 220b centralized accumulator fluid pressure to the wheel accumulators 152 and hydraulic actuators 147 for Nos. 3 and 4 wheels on the right side and for Nos. 3 and 4 wheels on the left side.

A common line 221b enables the single cam 215 of the leveling valve 151 to force downwardly the four wheels, Nos. 3 and 4 left and Nos. 3 and 4 right, whenever the cam 215 moves from neutral in a counterclockwise direction, indicative of unwanted settling of the vehicle at the rear. More particularly in this situation, the cam 215 opens an associated valve piston 213, causing hydraulic fluid to flow to the actuators in a path including the centralized accumulator system 161 (FIGURE 5), leveling circuit 163, right portion of leveling valve 151, check valve 220b, common line 221b, and the four wheel accumulators 152 for the actuators 147 of the four wheels Nos. 3 and 4 left and Nos. 3 and 4 right.

Also, the common line 221b enables the single cam 215 of the leveling valve 151 to exhaust fluid from the actuators 147 and raise all four wheels, Nos. 3 and 4 left and Nos. 3 and 4 right, whenever the cam 215 moves from neutral in a clockwise direction indicative of the rear portion of the vehicle being too high.

The construction of each wheel accumulator 152 is similar in construction and function to the centralized accumulators 156a, 156b except that they are smaller in size and it is to be noted that the front pair of wheel actuators 147 on both the left and right sides of the vehicle 1 each have a pair of wheel accumulators 152, 152 whereas the Nos. 3 and 4 wheel actuators on the right side as well as the Nos. 3 and 4 actuators on the left side only each have one accumulator 152. This is because the No. 1 and 2 wheel accumulators on the right side and the left side support greater loads at the front of the vehicle 1 where the scraper bowl 25 is located for carrying vehicular loads. The No. 1 wheel accumulator 152 communicates with line 221 which also passes the fluid through the orifice check valve or dampener 222 which is so constructed to permit fluid flowing from the wheel accumulators 152 to the wheel valve 148 and to the wheel actuator 147 to be slowed down relative to fluid flow from the wheel actuator 147 and the wheel valve 148 to the accumulator 152 (see FIGURE 8). Thus if the wheel 3 is subjected to external load the wheel accumulator 152 will absorb the shock rather quickly as the wheel 3 is moved upward but when the wheel rebounds or descends after the shock load has left, the wheel 3 falls relatively slower thus dampening the effect of the shock load and providing a smoother ride for the operator. Each one of the eight wheel valves 148 and eight wheel actuators 147 has an associated dampener 222.

As will be apparent with the parts in the operative positions taken as shown in FIGURE 8, each of the pairs of accumulators 152 and their common wheel actuator 147 have normally open means of communication therebetween, as provided through the valves 222 and 148 in a path including the orifice check valve 222, the conduit 204, the chamber area 224 between the spools 225 and 226 of the wheel valve element 148a, and the line 205 connected between the valve 148 and the actuator 147. A relief valve 227, which can have a pressure setting such that, at or above 6,000 p.s.i., for example, the valve will unload pressure into the reservoir R, is connected in the line 205 between the No. 1 wheel valve 148 and the wheel actuator 147 on the vehicle left side. A similar pressure relief valve 227 is in all the other wheel actuator lines 205.

The wheel actuator 147 for the No. 1 left wheel 3 is of the conventional rotary vane type having rotor blades 228 affixed to the axle 142 and stator member 229 affixed to the housing 143 integral with the tractor frame 2 and permits movement of the wheel 3 relative to the tractor frame 2 in a given position depending on the centralized accumulator pressure in line 205. The non-pressure side of the rotor vanes or blades 228 are vented for communication with the reservoir 170, and bleed-off lines 218 between the dampener 222 and the wheel valve 148 empties into the left or drain side of the leveling device 149 when the wheel valve 148 is in sprung position and when the wheel is lowered to open valve 214 the fluid flows through passage 219 to passage 230 of wheel valve 148 to the reservoir 170 as indicated by the arrow and letter R, FIGURE 8.

In FIGURE 11, the suspension mechanism 145 is shown for the No. 1 wheel 3 on the right front side, and the mechanism 145 contains a rotary vane actuator which is indicated by dash lines. Actuators of the rotary vane type are also used for the No. 2 wheels 4 on the right and left sides, respectively.

The wheel accumulators 152, the wheel actuator 147, the shock load and replenishing check valve 220, the orifice check valve or dampener 222, and the wheel valve 148 constitute the hydro-pneumatic package 212. There are eight such packages 212, one for each of the eight wheel assemblies 144 and each package is coupled to the frame 2 and the respective assembly 144. The three leveling valves 149, 150 and 151 are integrated with the No. 1 right and left side packages 212 and the No. 4 package 212 right side respectively. The No. 1 leveling valve 149 left side cares for leveling of the No. 1 and No. 2 wheels left side, the No. 1 leveling valve 150 right side cares for the leveling of the No. 1 and No. 2 wheels right side, and the No. 4 leveling valve 151 right side cares for the leveling of the Nos. 3 and 4 wheels on both the right and left side.

On the tractor's right side line 222a connects with the hydro-pneumatic unit for the No. 2 wheel and has a restrictor in its line to prevent surges of pressure transmitted by the shock load to one wheel causing them to be diminished so as to have little effect on the other wheel and its hydro-pneumatic package or unit. Similarly line 221 supplies accumulator pressure to a hydro-pneumatic unit for the No. 2 wheel on the left side which also has a restrictor. Similar circuitry 221b exists from check valve 220b to supply fluid pressure from leveling valve 151 to the No. 3 left and right hydro-pneumatic packages 212 and the No. 4 left and right package 212.

Lines 205, 204, 218, 219, 230 and 203 (FIGURE 8) carry fluid from the wheel actuators 147 of the eight wheel and axle assemblies 144 to the No. 1 left and No. 1 right and No. 4 right leveling valves 149, 150 and 151 respectively whence the fluid in the sprung position travels via the respective wheel valve 148 to the reservoir 170.

Thus in the sprung position the three leveling valves maintain the tractor in a sprung suspension.

This suspension in the sprung position always maintains the tractor frame level and horizontal relative to the ground regardless of the weight of the vehicle, regardless whether the scraper bowl 25 is loaded or unloaded, and regardless whether or not the vehicle remains horizontal or parallel to the ground over which it traverses. Each of the wheel accumulators 152 is replenished by the centralized accumulators 156a 165b whenever the pressure falls off in the hydro-pneumatic package. This is, of course, if the pressure falls off, the wheels 3, 4, 5 and 6 right or left side will collapse rotating the affected cam member 215 and opening the proper leveling valve 149 150 and 151, to the centralized accumulator pressure with consequent maintenance of the vehicle in its level position while each hydro-pneumatic wheel accumulator 152 absorbs the road hardness and maintains the vehicle in a smooth riding condition. Neither can the pressure from the wheel accumulators increase in value in accordance with loading of the vehicle such as to have the vehicle leave its level or neutral position for then the cam 215 would rotate in opposite direction and permit the leveling valve 149 to open the hydro-pneumatic line 218 to drain. Consequently it is seen that the weight of the body 2 is supported by the pressure in the centralized system and that pressure will only vary if the weight of the body 2 varies, but regardless of body weight the leveling valves 149, 150, and 151 will always maintain the body 2 in the same position relative to the ground over which the vehicle 1 travels in the sprung position.

Hence, the wheels operate by sets in unison for leveling. In summary: the wheel and spindle assemblies 144 which mount the pair of No. 1 and No. 2 left front wheels 3 and 4 are automatically raised or lowered until the leveling valve 149 is closed in its satisfied position, the wheel and spindle assemblies 144 which mount the pair of No. 1 and No. 2 right front wheels 3 and 4 are automatically raised or lowered until the leveling valve 150 is closed in its satisfied position, and the wheel and spindle assemblies 144 which mount the pairs of No. 3 and No. 4 left rear wheels 5 and 6 and No. 3 and No. 4 right rear wheels 5 and 6 are automatically raised or lowered until the leveling valve 151 is closed in its satisfied position.

The wheel actuators 147 for the rear sets of wheels 5 and 6 on the right and left side of the vehicle 1 are of the ram piston and cylinder type in counter distinction to the rotary vane type for the left and right forward sets of wheels 1 and 2. Each ram unit 233 is single acting extending itself to raise the body 2 upon increase in pressure in the cylinder and retracting itself due to gravity or the weight of the vehicle consequent upon depletion of the fluid from the cylinder. On inlet-outlet port (not shown) is provided at the head end of the ram cylinder, the pressure chamber of the ram unit being in the head and thus arranged to receive pressure fluid, the mechanical connection at the piston rod end of the ram unit 233 to each rear wheel 5 or 6 being by way of the bellcrank 234.

In FIGURE 12, the mechanical connection just described is shown leading from the ram unit 233 to the crank 234 for controlling a specific right wheel 6 in the rear sets of wheels. The ram unit design gives entirely satisfactory results when used in the rear sets of wheels 5 and 6 as the stroke is not as great as would be required if the ram unit was in the forward set of wheels since the tractor body 2 is pivoted about its rear portion in the vicinity of the rear sets of wheels 5 and 6. However, rotary actuators or wheel cylinders may be used as the wheel actuator 147 for all 8 wheels.

Rigid condition of suspension

The vehicle 1 may be placed from the sprung position to the unsprung position by movement of the sprung-unsprung control valve lever 157a into the leftward position as shown by the broken lines in FIGURE 10. All wheel valves 148 are correspondingly shuttled into the extreme left position as viewed in FIGURE 8, and function as shut-off valving stopping all flow of fluid between the wheel accumulators 152 and the wheel actuators 147.

To induce such shuttling of the valves 148, the valve stem 157b is moved, from the position as shown in FIGURE 10, into an extreme right position applying the centralized fluid pressure from the valve 157 to the circuit 164b, which had immediately prior thereto been connected to drain. The circuit 164b introduces the fluid pressure at the opposite or right side of each wheel valve 148 shifting it to the left as aforementioned and permiting the wheel valve to drain by way of circuit 164a which drains back to the reservoir 170 by way of valve 157, said circuit 164a formerly conducting pressure fluid to each wheel valve 148 but now reversing fluid flow due to the movement of the sprung-unsprung valve 157.

The direction of flow of fluid in the centralized system 162 when the vehicle 1 is in the unsprung position is indicated by arrows in FIGURE 6. The leveling circuit 163 remains unaltered except that fluid directed into each wheel valve 148 in chamber or areaway 231 now passes out lines 204 and 218 back to the left end (FIGURE 8) of the leveling valve 149, 150 or 151 and if the 214 opens, the flow of fluid is circulated back through lines 219 and the wheel valve chamber 231 to line 204. Thus it is seen that the leveling valves 149, 150 and 151 will permit fluid to enter each wheel accumulator 152 for charging it but no fluid is allowed to discharge from the leveling valves 149, 150, 151 to reservoir 170. Since the hydro-pneumatic spring means or wheel accumulators 152 are divorced from the wheel actuators 147 the tractor 1 assumes a condition of unsprung or rigid suspension.

Manual pitch and tilt setting

Moreover, the tractor frame 2 may now have its attitude changed relative to its track units 9, 10 and relative to the ground by operation of the manually controlled left and right hand valve units 158 and 159 (see FIGURES 7, 8, 9 and 10). The left and right control valves 158, 159 have lines 235, 235a of the wheel control valve circuit 166 leading from them into the No. 1 and No. 2 left and right wheel valves 148 respectively for supplying a maximum pump pressure of 6000 p.s.i. to each of the No. 1 and No. 2 wheel actuators 147 on the left side and the No. 1 and No. 2 wheel actuators 147 on the right side by way of the areaways 236, 236a within each of the front wheel valves 148 because of the positioning of each wheel valve 148 in the unsprung position. Each of the lines 235 and 235a are in fluid communication with the pump 155 via lines 237 and 237a when each control valve level 238, 238a positions its respective control valve spool 239, 239a into its extreme left or raise (R) position as viewed in FIGURE 9 to block fluid communication of the respective pilot line 176, 176a causing a build-up in pressure of the respective check valve 175, 175a closing it and allowing fluid from the pump 155 to flow through the respective line 237 or 237a, orifice check valve or surge device 240 and areaways 241, 241a of either valve 158 or 159, and respective line 235 or 235a, and cutting out flow of fluid to the pressure regulating valve 156 and the centralized accumulators 156a, 156b by way of lines 177, 177a. Movement of each of the control levels 238, 238a into the lower (L) position shifts the respective valves 239, 239a to the right as viewed in FIGURE 9, so as to assume a lowering position. In that position, the pilot lines 176, 176a are blocked. Therefore, the pilot controlled check valves 175 and 175a discontinue the flow of hydraulic fluid in the circuit of the system 146 including the lines 177, 177a, pressure regulating valve 156, centralized accumulators 156a, 156b, line 162, and lines 163 and 164 (FIGURE 7) leading to the wheel valves 148 and the sprung-unsprung valve 157. At that time, the hydraulic fluid flow which does occur is in separate branches of a parallel flow circuit, one branch including valve 175a, line 176a, raise-hold-lower valve 159, line 166, line 235a, and wheel valve 148 leading to the No. 1 right wheel actuator 147, and the other branch including the valve 175, line 176, raise-hold-lower valve 158, line 235, and wheel valve 148 leading to the No. 1 left wheel actuator 147.

These control valves 158, 159 are of conventional structure and may be operated independently of each other such that the high pressure fluid from the pump 155 is directed to either the No. 1 and No. 2 wheel actuators 147 on the right side or the No. 1 and No. 2 wheel actuators 147 on the left side for raising the front right or front left side of the tractor 1 by downward movement of the respective wheel arms 140 relative to the tractor frame 2 or simultaneous operation of both control valves 158 and 159 can raise the entire front portion of the tractor 1 relative to the ground. The flow of the fluid for tilting or varying the attitude of the front portion of the vehicle 1 is illustrated by the diagram and its arrows of FIGURE 7 and the centering spring 242 in the respective left or right hand control valve 158, 159 upon release returns the respective valve spool 239, 239a to the hold (H) or neutral position wherein the pilot line or circuit 176 or 176a is allowed to drain through the respective control valve 158, 159, the apron control valve 161, and/or the ejector control valve 160 by line 243 back to reservoir 170 and at the same time the control valves 158, 159 terminate fluid communication between the pump 155 and each hydraulic actuator 147 This permits locking of the vehicle body 2 in a position which may be horizontal or parallel to the ground or may be tilted relatively to the ground The tilting of the vehicle body or the change in attitude of the vehicle body about its longitudinal or transverse axis or both is also accommodated by the fact that in the unsprung condition the position of the No. 3 right and left wheel valves 148 permit the fluid from the No. 3 right and left hand wheel actuators 147 to be dumped to the reservoir 170 by way of line 244 from each No. 3 wheel valve 148 to the reservoir 170 whereas the fluid in the wheel actuator No. 4 is allowed to communicate with the wheel accumulator No. 4 on the right side by the cross-over line 245 communicating with the respective No. 4 right and left wheel valves 148 and actuators 147, the cross-over line 245 being in hydraulic lock so that none of its fluid can return to the reservoir 170. The fluid in the cross-over line 245 can spill back and forth between the No. 4 actuators on the right and left side as the vehicle is pivoted about its longitudinal axis by manipulation of the right and left control valve levers 159 and 158 for tilt of the vehicle and the No. 3 right and left hand wheel actuators permit free floating of the No. 3 right and left wheels since said actuators 147 are open to drain. Similarly, when both right and left hand control valves are operated simultaneously for raising and lowering the front end of the vehicle pivot again occurs about the No. 4 wheels since the fluid in the cross-over line is hydraulically locked therein. The lowering of the entire front or the left front portion or right front portion of the vehicle 1 is accomplished by simultaneous or independent shifting respectively of the control valve levers 238 or 238a to the L or lower position moving either spool valve member 239 or 239a rearwardly or to the extreme right position as viewed in FIGURE 7 or 9 terminating fluid flow from the pump 155 and lines 237 and/or 237a to feeder lines 235 and/or 235a and allowing the fluid from the lines 235 and/or 235a to flow through areaways 241, 241a in either control valve member 239 or 239a into line 246 and/or 246a through metering gears 160' to line 247 and back to the reservoir 170.

The purpose of the metering gear assembly 160' is to allow the tractor 1 to settle evenly since the fluid from one feeder line 235 or 235a cannot pass through the reservoir 170 any faster than the fluid from the other feeder line 235a or 235 as it passes through the gears 248, 249 and 250 and out to line 247 to the reservoir. Where fluid is flowing from only one of the lines 235, 235a to one of the gear groups 248, 249 or 249, 250 in order to avoid cavitation with the meshing of the other gear set 249, 250 or 248, 249 the drop in pressure results in unseating the valve 251 or 252 where the cavitation is occurring allowing fluid to pass through it from the side where the fluid was flowing through and pass through the gear groups 248, 249 or 249, 250 causing the cavitation and thus eliminating such cavitation.

As previously mentioned the presence of the leveling valves 149, 150, 151 in the system allow the vehicle 1 to have a suspension in the unsprung as well as the sprung condition. The scraper edge 37 and the dozer edge 100 being fixed to the body portion 2 and movable in accordance therewith are positionable in horizontal and inclined planes for digging in a lowered, raised or level attitude or a tilted attitude relative to the ground in the unsprung position of the tractor vehicle 1.

The apron control valve 161 and the ejector control valve 160 may be operated hydraulically by apron circuit 167 and ejector circuit 168 respectively leading from the pump 155 to the apron 16 and ejector 28 whether the tractor 1 is in the sprung or unsprung position but the attitude of the tractor 1 may only be varied when it is in the unsprung position for the flow of fluid through feeder lines 235 and 235a to each wheel actuator 147 is blocked by the positioning of each respective wheel valve 148 in the sprung position. This is a caution which prevents the operator from varying the attitude of the vehicle 1 when traveling at high speeds but permits it when he is traveling at low speeds in the unsprung position of the vehicle. Fluid pressure from the pump 155 to the apron control valve 161 is by way of pump line 237 through annular areaway 253 in the lefthand control valve 158 and out apron circuit or line 167 into the apron control valve 161 delivering one-half of the pump capacity or 12½ gallons and through line 254 out of the valve 161 to apron two-way ram units 48, 49 for raising the apron 16 when the apron control valve lever 161a is in the R or raised position with the apron control valve member 161b shifted to the left as seen in FIGURE 9, and the apron 25 being lowered by the pump pressure when pump feeder line 237 communicates with line 167 and areaway 253a of valve 161 and line 254a leading to the right side of the apron ram unit 43, 49 when the control valve unit 161 is in the L or lowered position, the flow of the fluid from line 167 into the apron control valve 161 being possible in raise or lower positions since only pilot line 176 is blocked by the element 161c or 161a of the apron control valve member 161b in the raise or lower positions.

The ejector 28 is pump powered forward and back, said ejector 28 being moved forward when the ejector control valve lever 160a is in the F or forward position permitting fluid from both pump lines 237, 237a to flow into the ejector circuit 168 which includes line 255 which communicates with line 237a in righthand wheel control valve 159 and line 167 which communicates into the apron and ejector valve housing 257 and line 256 in housing 257 for connecting lines 167 and 255 in ejector cylinder 160c through which passes valve member 160b. Both lines 255 and 256 deliver the fluid up to the ejector valve 160 when their respective pilot circuits 176a and 176 are blocked by the control valves 158 and 159; or 160 and 161. When the ejector control valve is in the F or forward position both pilot circuits 176, 176a are blocked to drain and pump lines 237 and 237a deliver 12.5 gallons each of the fluid to areaway 258 of ejector control valve 160 and out line 259 to right side of ejector ram unit 29 receiving the full pump capacity at 25 gallons and moving the ejector forward, whereas the ejector gate 28 is retracted under the power of the pump which utilizes half capacity or 12.5 gallons by way of pump line 237a through the right control valve 160 through line 167 and into areaway 259a of ejector valve 160 and out through line 260 to move the ejector gate 28 backward, since the land 160d of the valve member 160b of the ejector valve 160 is in its left or backward (B) position and blocks only pilot line 176a to reservoir 170 but not pilot line 176. Ejector forward operations require full pump capacity. However, the rod 29a of the ram unit 29 in retraction of the ejector 28 takes up a good portion of the cylinder 263 and therefore only half of the pump capacity is required.

A further modification shown in FIGURE 13 shows a partial section of the unsprung condition of the No. 3 and No. 4 right and lefthand leveling valve circuitry 163 which includes an additional leveling valve unit 265 same in construction and function to the other three leveling valves 148, 149 and 150, said valve 265 having the circuitry for receiving fluid from the No. 4 wheel actuator 147 on the right side and sending it to reservoir in a manner previously discussed for the leveling valves 149, 150, 151, and the leveling valve 265 is affixed to the No. 4 wheel 6 on the left side of the vehicle 1 in a manner similar to the attachment of the leveling valve unit 151 to the No. 4 wheel 6 on the right side of the vehicle 1. This additional leveling valve unit 265 is connected in series with the No. 4 leveling valve unit 151 on the right side by continuation of the outlet leveling line 217 of the leveling valve 151 with line 266 which enters right free piston 213 (see leveling valve construction of FIGURE 8) of said leveling valve 265 and out through line 267 to a one-way check valve 268 which has line 269 in communication with the cross-over line 245 so as to permit centralizing accumulator pressure to unseat the check valve 268 whenever the pressure in the cross-over line 245 is less tha the pressure required to maintain the tractor No. 3 and No. 4 wheels on the right and on the left side in the neutral position. That is, when due to leakage the tractor tends to settle at its rear end and this cannot occur since when both of the rear sets of wheels 5, 6 on the right and left side tend to settle together each free piston 213 of leveling valves 159, 265 unseat due to the operation of each respective cam 215 and allow pressure fluid from the centralized accumulator system 162 to supply the crossover line 245 and each respective wheel actuator 148 with sufficient pressure to maintain each cam 215 in its horizontal or neutral position. If only one or the other of each cam 215 of the valves 159, 265 shifts position from neutral, as would be the case when the tractor is tilting in the unsprung condition, pressure from the centralized accumulator circuit 162 could not be admitted to the crossover line 265 since each cam 215 of valves 159, 265 were not moved together from each of their neutral positions.

Another difference of FIGURE 13 from FIGURES 5, 6, or 7 is that the Nos. 3 and 4 wheels are operated by rotary type actuators.

The attitude variation of the vehicle 1 is accomplished by manipulation of each of the control valves 158, 159 such that raising of either of the front side portions of the tractor 1 is effected by subjecting it to the pump pressure, whereas lowering of either of the side portions is effected by the weight of the vehicle 1 and the fall is due to gravity and is not pump powered although the lowering of such front portions can be pump powered.

The manner of the deployment of the suspension system for the unsprung condition disclosed herein presents a balanced and desired geometrical point distribution considering that the greatest weight is in the area of the bowl portion 25 of the tractor 1 particularly when this bowl 25 is filled with a load and also the greatest external forces are applied at the front end of the tractor due to the dozing operation. Also, the tilting of the tractor occurs along its frontal portion. Therefore placing two points of the suspension at the front end and one point at the rear end permits maximum stability of the tractor considering that the weight of the tractor 1 unloaded (i.e. with an unloaded bowl) places the center of gravity of the tractor 1 over right and left No. 3 wheels and midway therebetween, as when the bowl 25 is loaded, the center of gravity is over the right and left No. 2 wheels and midway therebetween. Consequently when performing digging operations with a front scraper or dozing operations with the dozer blade 100, the center of gravity is in back of and generally midway between the two suspension points in the forward portion of the tractor 1 and the weight at the center of gravity must be overcome before the tractor can tilt. Thus a particular arrangement of the three-point system herein disclosed lends maximum stability to the tractor when performing its scraping and dozing operations.

Each wheel accumulator 152 as well as the centralized accumulators 156a, 156b have a predetermined charge of dry nitrogen. The resultant ride characteristics is related to the load versus the maximum compression of the gas in each accumulator 152 associated with the rise of each wheel 3, 4, 5 or 6. The hydraulic pump 155 cuts in as pressure is required in centralized accumulators 156a, 156b, otherwise there is free flow to the reservoir 170. Weight differential at each wheel 3, 4, 5, or 6 as a result of the loaded and unloaded condition bring into operation each of the leveling valves 149, 150, 151, 265 (actuated by each cam 215 attached to each wheel arm 140) either adding or removing pressurized fluid to maintain a constant neutral position. High pressure resulting from rapid rise of the wheel from going over an obstacle at high speed causes shock load check valves 220, 220a, 220b to prevent high pressure from entering the centralized accumulators 156a, 156b by way of the leveling valves 149, 150, 151 and 265 and each shock load relief valve 227 to reservoir 170 limits high line pressure, and each dampener valve 222 limits rebound speed as a result of rapid rise of the wheels 3, 4, 5 or 6 (i.e. slows the downward movement of each wheel 3, 4, 5 or 6), and the leveling circuit 163, including its valves 149, 150, 151 and 265, to maintain the vehicle in sprung or unsprung level suspension when tilt operations are not being performed. However, movement of the control valves 158, 159, 160 and 161 actuate the split flow pilot line circuits 176 and/or 176a to cut in high pressure from the pump 155 to perform tilt, apron operations, and ejector operations and cut-out flow to the pressure regulator 156 and the centralized accumulators 156a, 156b.

It is to be noted that the purpose of the leveling valves 149, 150, 151 and 265 is to establish the equilibrium riding position of the vehicle 1 and prevent the tractor 1 from sinking down since it is supported hydraulically by pump pressure delivered by way of the centralized accumulator system 162.

Rotary vane type actuators 147 are preferred since they provide a compact unit with maximum angular displacement of the wheels 3, 4, 5 or 6.

The purpose of the metering gear unit 160' is to stabilize the vehicle 1 for as the front of the vehicle 1 is lowered in the unsprung position with suspension provided for tilt feature, the tractor 1 would have a tendency to go into uncontrolled tilt position due to weight shift and to avoid this condition the return oil is metered through this metering gear unit 160' and prevents automatic tilt and provides controlled tilt as well as stable control for raised or lowered positions.

Upstop retraction

As previously mentioned the vehicle has four upstops 206, 207, 208 and 209. The first upstop 206 being for the left No. 1 wheel 3, the second upstop being for the left No. 2 wheel 4, the third upstock being for the right front No. 1 wheel 3 and the fourth upstop being for the right No. 2 wheel 4. The purpose of each of the upstops is to limit the maximum upward travel of each of the wheels to avoid a blow-out of each wheel accumulator 152 associated therewith. Each upstop is a mechanism therefor for limiting the maximum travel of the wheel upward in the sprung position of the tractor 1 and consists of a retractible abutment 210a affixed to the respective side of 7, 7a of the body frame 2 in obstructing relationship to each respective wheel abutment 210b of the right and left No. 1 and No. 2 wheels 3, 4 when the vehicle 1 is in its sprung condition where the wheel accumulators are subject to ground forces and is in unobstructing relation to each wheel abutment 210b when the vehicle 1 is in the unsprung condition. Each upstop abutment 210a (see FIGURE 6, left front upstop 206) comprises a pivotal element 210c for having engagement with each respective wheel abutment 210b. This element 210c is pivotally affixed to the respective side 7, 7a of the tractor body 2 and carries piston 210d and a cylinder 210e for pivotal movement thereof, the cylinder 210e being in communication with line 210 or 211 communicating with line 164b. As mentioned this wheel valve line 164b is open to drain in the sprung position permitting the piston 210d to extend all the way into the cylinder 210e by retaining spring 210f. However, when the tractor is placed in the unsprung condition fluid line 210 or 211 leading from the wheel valve line 164b contains fluid under hydraulic pressure from the centralized accumulator system 162 forcing the piston 210d to move downward and swing each retractable abutment or upstop 206, 207, 208 and 209 down and out of the way of the respective wheel abutment 210b permitting each No. 1 and No. 2 righ and left wheels 3, 4 to go its maximum upward travel as well as to go down to its lowest travel. The retractible upstops 206, 207, 208 and 209 therefor serve to protect each wheel actuator 147 and wheel accumulators 148 when the tractor 1 is traversing over bumpy or uneven ground in the sprung condition or position at high speeds.

It can thus be seen that the vehicle of the type described has a unique type of suspension. The suspension is twofold, that is, when the vehicle is in transport and traveling say at high speeds of around thirty miles an hour, the suspension is resilient or sprung, but when the vehicle is operating at a few miles an hour and performing earthworking operations, then the suspension of the vehicle is rigid or unsprung. The sprung suspension of the body relative to its track members is accomplished by diverting the fluid from the pump 155 to the centralized accumulators 156a, 156b by way of the pressure regulating valve 156, the centralized accumulators 156a, 156b acting as a medium of stored energy whence the fluid goes from the centralized accumulators to the levelling valves 149, 150, 151, or 265 by way of the levelling circuit 163 and to the wheel valves 148 by the wheel valve circuit 164. The wheel valve circuit permits communication of the fluid between the wheel actuators 147 and the wheel accumulators 152 by way of the wheel valves 148 which are so positioned by the fluid pressure from the centralized accumulators and this fluid pressure is applied or drained from the wheel actuators so as to maintain the body of the tractor level to the ground, this being accomplished by maintaining a relation between the wheels and wheel arms 140 relative to the body of the tractor. When it is desired to perform earthworking operations, the sprung-unsprung valve 157 shifts the vehicle from the sprung position to the unsprung position and then the fluid is diverted to the wheel valves so as to reposition them and prevent fluid communication between the wheel accumulators and the wheel actuators and therefore the body can no longer spring relative to the track members. Also, by movement of the control valves 158, 159 the pump fluid pressure is diverted by the lines 235 and 235a to the forwardly disposed wheel actuators for operation of the forwardly disposed wheels of the track assembly to position the tractor in raised, lowered, and tilt positions to perform the various earthworking operations.

It will be appreciated that any description as to the amount of hydraulic pressures used or the amount of oil used is merely for purposes of description. Similarly hydro-pneumatic suspension is only one method of suspension.

What is claimed is:

1. In a track-type vehicle having a plurality of track wheels supporting the vehicle body and arranged in sets each consisting of at least a pair of wheels apiece:
   mounting means mounting at least one wheel for movement in a generally vertical direction with respect to the body;
   linkage connected to the body, including hydraulic actuator means connected to the wheel-mounting means for controlling the elevation of the sets of vertically movable wheels;
   said actuator means comprising plural hydraulic actuators each having a generally cylindrically shaped body to define the working chamber and including a pressure-fluid-admitting chamber portion;
   valve means for each of the sets, said valve means connected to, and actuated by such movement of certain of the wheels in each set and controlling a supply of fluid under pressure to and from the actuator means for the respective set of vertically movable wheels tending to maintain the vehicle body level during its movement over irregular terrain;
   accumulator chamber means containing compressible means having normally open means of communication between the accumulator chamber means and the actuator means and acting to cushion the vertical movement of the wheels; and
   valve means independent of the first named valve means, and connected in the means of communication between the accumulator chamber means and the actuator means and constituting the sole means to prevent such cushioning action;
   said means of communication being connected to the pressure-fluid-admitting chamber portion of each of said plural hydraulic actuators.

2. The invention according to claim 1, at least some of said hydraulic actuators consisting of hydraulic cylinders of which the pressure-fluid-admitting chamber portion is at the head end of the cylinder.

3. The invention of claim 2, said working chamber of each of the hydraulic actuators further including a second chamber portion besides the pressure-fluid-admitting chamber portion; and
   surge means in communication with one chamber portion of each of said plural hydraulic actuators.

4. In a track type vehicle having a plurality of track wheels supporting the vehicle body and operative in sets each consisting of at least a pair of wheels apiece:
   mounting means mounting the track wheels for independent movement of the sets of wheels in a generally vertical direction with respect to the body;
   linkage connected to the body, including hydraulic actuator means connected to the wheel mounting means for controlling the elevation of the sets of vertically movable wheels;
   fluid under pressure supply means having first communication means leading to and from the actuator means, said actuator means comprising plural hydraulic actuators each having a generally cylindrically shaped body to define the working chamber and including a pressure-fluid-admitting chamber portion;

valve means actuated by such moment of certain of the vertically movable wheels and connected in said first communication means for controlling the supply of pressure fluid to and from the actuator means for the sets of vertically movable wheels tending to maintain the vehicle body level during its movement over irregular terrain;

accumulator chamber means having means of communication which is connected between the accumulator chamber means and the actuator means so as to hydraulically parallel the first communication means leading to and from the actuator means, said accumulator chamber means containing compressible means and acting to cushion the vertical movement of the wheels;

shut-off valving connected in the means of communication between the accumulator chamber means and the actuator means to prevent such cushioning action;

said means of communication being connected to the pressure-fluid-admitting chamber portion of each of said plural hydraulic actuators, said working chamber of each of the hydraulic actuators further including a second chamber portion besides the pressure-fluid-admitting chamber portion; and surge means in communication with one chamber portion of each of said plural hydraulic actuators.

5. In a track type vehicle having fluid under pressure supply means, and having plural track wheels supporting the vehicle body and hydropneumatically operative insets each consisting of at least a pair of track wheels apiece:

mounting means mounting the track wheels for independent movement of each set of the wheels in a generally vertical direction with respect to the body;

linkage connected to the body, including hydraulic actuator means connected to the wheel mounting means for controlling the elevation of the sets of vertically movable wheels;

communication connected to the actuator means of the sets of track wheels adapted to lead to and from said fluid supply means, said actuator means comprising plural hydraulic actuators each having a generally cylindrically shaped body to define a working chamber and including a pressure-fluid-admitting chamber portion;

valve means actuated by such movement of certain of the vertically movable wheels and connected in said communication for controlling the supply of fluid under pressure to and from the actuator means for the sets of vertically movable wheels tending to maintain the vehicle body level during its movement over irregular terrain;

accumulator chamber means containing compressible gas means acting to cushion such wheel movement, and having hydraulic interconnection with the actuator means which is established by a connection to said communication at a point between said valve means and actuator means;

shut-off valving connected in said hydraulic interconnection between the accumulator chamber means and the actuator means to prevent such cushioning action;

said communication being connected to the pressure-fluid-admitting chamber portion of each of said plural hydraulic actuators, and at least some of said hydraulic actuators consisting of hydraulic cylinders of which the pressure-fluid-admitting chamber portion is at the head end of the cylinder.

6. In a vehicle having a plurality of track wheels supporting the vehicle body and operative in sets each consisting of at least a pair of wheels apiece:

ground engaging tracks trained over the sets of track wheels;

mounting means comprising wheel bearing spindles mounting the track wheels for independent movement of the sets of wheels in a generally vertical direction with respect to the body;

linkage connected to the body, including hydraulic actuator means connected to the wheel mounting means for controlling the elevation of the sets of vertically movable wheels;

said actuator means comprising plural hydraulic actuators each having a generally cylindrically shaped body to define a working chamber therein which includes a pressure-fluid-admitting chamber portion, and further having individual wheel valve means with which the pressure-fluid-admitting chamber portion of respective actuator communicates and which transmits the pressure fluid for the actuator;

fluid under pressure supply means having communication means leading to and from the wheel valve means;

valve means actuated by such movement of certain of the vertically movable wheels and connected in said communication means for controlling the fluid to and from the wheel valve means of the wheel actuators, with a leveling action tending to maintain the vehicle body level during its movement over irregular grounds; and accumulator chamber means having hydraulic interconnection with the wheel valve means which is established by a connection to said communication means at a secondly near point relative to the actuators, between said valve means and wheel valve means, said accumulator chamber means containing compressible means and acting to cushion vertical movement of the wheels;

said wheel valve means containing shut-off valving interposed therein at a first point hydraulically nearer to the actuators than the second point and positionable to prevent such cushioning action and such leveling action.

7. In a vehicle having a plurality of vertically movable support means, hydraulic actuators interconnecting the vehicle and each of said support means, said actuators having a source for supplying fluid pressure thereto, and a scraper blade extending transversely of the vehicle:

selectively operable control means for the actuators, comprising first means interconnecting the source and the actuators for yieldably resisting vertical movement of said support means and applying a restoring force to the same;

second means carried by said vehicle and connected to the first means for selectively interrupting the described operation of said first means; and third means carried by said vehicle and connected to the first means for, selectively, locking the support means against vertical movement or inducing vertical movement of selected ones of said support means, whereby the scraper blade may be pitched or tilted.

8. The invention of claim 7, wherein said first means comprises wheel valves connected to different ones of said actuators, shiftable valve elements in said wheel valves forming a part of said second means and operatively positionable for selectively interrupting the described operation of said first means;

said wheel valves having a single manual control means common thereto and in hydraulic communication therewith to change the operative position of said shiftable valve elements in unison.

9. The invention of claim 7, further comprising:

hydraulically positioned upstops carried by said vehicle and pivotable into an operating position on said vehicle above the vertically movable support means to positively limit up movement of said support means, and having an unpivoted non-operative position; and motion-transmitting means engaging the hydraulically positioned upstops and connected to, and moving when said second means moves for selectively interrupting the described operation of said first means, to return the hydraulically positioned upstops into their unpivoted position.

10. In an endless track type earth-working vehicle having an earth-working blade, track engaging and supporting wheel assemblies which are movable up and down with respect to and carried by said vehicle, and mechanism comprising hydraulic wheel actuators interconnecting each of said wheel assemblies and said vehicle, said actuators having a source for supplying fluid pressure thereto, the improvement comprising:

hydraulic control means for each of said wheel assemblies and selectively operable to provide a resilient sprung suspension and a rigid unsprung suspension whereby the vehicle and the earth-working blade may be pitched or tilted;

said hydraulic control means being characterized wherein a plurality of said wheel assemblies each include a first operator control valve hydraulically connected to the actuator;

said hydraulic control means comprising first and second hydraulic circuits interconnecting said source and said first valve;

accumulator means in said first circuit;

leveling valve means in said first circuit between said source and said first valve, said leveling valve means being connected to the wheel assembly and responsive to up and down movements thereof to control fluid flow to and from the first valve; and a second operator control valve in said second circuit;

said first valve being selectively positionable between a first position blocking the second circuit and hydraulically interconnecting the first circuit and the wheel actuator whereby the wheel actuator is in hydraulic communication with the accumulator and leveling valve means to provide a resiliently sprung vehicle suspension, and a second position hydraulically interconnecting the second circuit and the wheel actuator and blocking communication from the accumulator and leveling valve means to the wheel actuator, to provide an unsprung vehicle suspension;

said second valve being selectively positionable to control fluid flow between said source and the actuator when the first valve is in said second position, to thereby control selective pitching and tilting of the vehicle.

11. The invention of claim 10, wherein said vehicle has an operator station, and a single selector valve located at the operator station and being in fluid communication with the first control valve in each of said pluarlity of wheel assemblies to control the movement of said first control valves between said first and second positions.

12. The invention of claim 10, said hydraulic control means being further characterized wherein another plurality of said wheel assemblies comprises a pair of laterally opposed wheel assemblies each including a third operator control valve hydraulically connected to the wheel actuator;

said hydraulic control means comprising a third hydraulic circuit interconnecting said source and both of the respective third valves;

a second-named accumulator means in the third circuit; and an hydraulic shuttle circuit;

the respective third valves of the hydraulic control means of the pair of wheel assemblies being interconnected by said hydraulic shuttle circuit;

said respective third valves having a second-named leveling valve means in common to their respective third circuits, the second-named leveling valve means being connected to at least one wheel assembly of said pair of wheel assemblies and responsive to up and down movements thereof to control fluid flow to and from said respective third valves;

the respective third valves being selectively positionable between a first position blocking the hydraulic shuttle circuit and hydraulically interconnecting the third circuit and the wheel actuators of said pair of wheel assemblies, whereby the wheel actuators are in hydraulic communication with the second-named accumulator and leveling valve means to provide a resiliently sprung suspension, and a second position blocking communication from the second-named accumulator and leveling valve means to the wheel actuators of said pair of wheel assemblies to provide an unsprung vehicle suspension;

said hydraulic shuttle circuit being operative when the respective third valves are in said second position to afford transfer of fluid between the actuators of the pair of wheel assemblies whereby up movement of either wheel assembly forces the laterally opposed other wheel assembly to be displaced by proportionate down movement.

13. The invention of claim 12, comprising means in hydraulic series connection between the second-named leveling valve means and said hydraulic shuttle circuit and connected to the other wheel assembly of said pair of wheel assemblies, said series connected means and second-named leveling valve means being responsive to up movement of the two wheel assemblies of said pair conjointly, to open for causing fluid to flow between said source and the wheel actuators of said pair of wheel assemblies when the third valves of said pair of wheel assemblies are in their second positions, to thereby apply fluid pressure causing said pair of wheel assemblies to undergo down movement.

14. The invention of claim 10, wherein the connection between the leveling valve means and the wheel assembly comprises rotatable cam means connected to the wheel assembly and engageable with the leveling valve means to operate it in accordance with displacement of the wheel assembly up and down from a desired undisplaced position, whereby the leveling valve means is operated to increase and decrease the fluid pressure from said source through said first circuit to and from said actuator, for maintaining the vehicle in a level transport condition of the vehicle when said first valve is in said first position, automatically in response to weight variations of the vehicle.

15. The invention of claim 10, comprising hydraulically positioned upstops carried by said vehicle and pivotable into an operating position on said vehicle above the wheel assemblies, to positively limit up movement of said wheel assemblies when the vehicle is in its resiliently sprung suspension condition, and having an unpivoted non-operative position; and motion-transmitting means engaging the hydraulically positioned upstops and connected to and moving when said first valve is selectively positioned in its second position, to return the hydraulically positioned upstops into their unpivoted position.

16. In a vehicle having vertically movable support means, hydraulically operated actuators interconnecting the vehicle and each of said support means, said actuators being adapted to receive pressure fluid from a source, and an earthworking tool extending transversely of the vehicle:

the combination with said support means and the associated actuators, of selectively operable control means for said support means to provide a yieldable, level suspension, and a rigid unsprung suspension whereby the vehicle and the tool may be pitched or tilted;

said selectively operable control means comprising a plurality of first control means, a plurality of said support means being each provided with one of said first control means communicatively connected to the associated actuator;

said selectively operable control means further comprising means hydraulically interconnecting said pressure fluid source and said first means, said interconnecting means comprising a plurality of parallel circuits;

leveling means in a first circuit of said parallel circuits;

accumulator means in said first circuit operative to cushion the vertical movement of said plurality of support means;

said leveling means being connected to the support means operative to respond to the vertical movement thereof for controlling the flow of pressure fluid to and from the first means;

said first means being positionable, when pressure is applied thereto, between first and second positions respectively for interrupting or for unblocking the flow of pressure fluid in a path through said first circuit and said first means to said actuators;

second operator control means in a second circuit of said parallel circuits, said second means being selectively positionable to control fluid pressure applied to said first means to position the first means selectively, for interrupting the described operation of the accumulator means and leveling means in the first position of the first means, and for unblocking said flow of pressure fluid to provide a yieldable, level suspension in the second position of the first means; and third operator control means in a third circuit of said parallel circuits, and being selectively positionable for blocking or directing the flow of pressure fluid and being communicatively connected to said actuators by the first means when the first means are in the first position, said third means being positionable as aforesaid for, selectively, blocking the support means against vertical movement or inducing vertical movement of selected ones of the support means, whereby the tool may be pitched or tilted.

17. In a vehicle having vertically movable support means, hydraulically operated actuators interconnecting the vehicle and each of said support means, said actuators being adapted to receive pressure fluid from a source, and a scraper blade extending transversely of the vehicle:

the combination with said support means and the associated actuators, of selectively operable control means for said support means to provide a yieldable, level suspension, and a rigid unsprung suspension whereby the vehicle and the scraper blade may be pitched or tilted;

said selectively operable control means comprising a plurality of wheel valve means, a plurality of said support means being each provided with one of said wheel valve means communicatively connected to the associated actuator;

said selectively operable control means further comprising means hydraulically interconnecting said source and said wheel valve means, said interconnecting means comprising a plurality of parallel circuits;

leveling means in a first circuit of said parallel circuits;

accumulator means in said first circuit operative to cushion the vertical movement of said plurality of support means;

said leveling means being connected to said plurality of support means operative to respond to the vertical movement thereof for controlling the flow of pressure fluid to and from the wheel valve means;

said wheel valve means being positionable, under application of pressure, between respective first and second positions for interrupting or for unblocking the flow of pressure fluid in a path through said first circuit and wheel valve means to said actuators;

second operator control means in a second circuit of said parallel circuits, said second means being selectively positionable to control pressure applied with respect to said wheel valve means to position the wheel valve means selectively, for interrupting the desired operation of the accumulator means and leveling means in the first position of the wheel valve means, and for unblocking said flow of pressure fluid to provide a yieldable, level suspension in the second position of the wheel valve means; and third operator control means in a third circuit of said parallel circuits, said third means having raise-hold-lower control levers and being selectively positionable thereby for blocking or directing the flow of pressure fluid and being communicatively connected to said actuator by the wheel valve means when the wheel valve means are in the first position, said control levers positioning the third means as aforesaid for, selectively, hydraulically blocking simultaneously the plurality of said support means against vertical movement, or inducing vertical movement of selected ones of the support means, whereby the scraper blade may be pitched or tilted.

18. In a vehicle having vertically movable support means, hydraulically operated actuators interconnecting the vehicle and each of said support means, said actuators being adapted to receive pressure fluid from a source, and an earthworking tool extending transversely of the vehicle;

the combination with said support means and the associated actuators, of selectively operable control means for said support means to provide a yieldable, level suspension, and a rigid unsprung suspension whereby the vehicle and the tool may be pitched or tilted;

said selectively operable control means comprising a plurality of first control means, a plurality of said support means being each provided with one of said first control means communicatively connected to the associated actuator;

said selectively operable control means further comprising means hydraulically interconnecting said source and said first control means, said interconnecting means comprising a plurality of parallel circuits;

leveling means in a first circuit of said parallel circuits;

accumulator means in said first circuit operative to cushion the vertical movement of said plurality of support means;

said leveling means being connected to said plurality of support means operative to respond to the vertical movement thereof for controlling the flow of pressure fluid to and from the first means;

said first control means being positionable, when pressure is applied thereto, between first and second positions respectively for interrupting or for unblocking the flow of fluid in a path through the first circuit and said first control means to said actuators;

second operator control means in a second circuit of said parallel circuits, said second means having a sprung-unsprung unilever control and being selectively positionable thereby to control pressure applied to said first control means to position such first control means of the plurality of said support means selectively, for simultaneously interrupting the described operation of the accumulator means and leveling means in the first position of the first control means, and for unblocking said flow of pressure fluid to provide a yieldable, level suspension in the second position of the first control means; and third operator control means in a third circuit of said parallel circuits, and being selectively positionable for blocking or for directing the flow of pressure fluid and being communicatively connected to the actuators by the first control means when the first control means is in the first position, said third means being positionable as aforesaid for, selectively, blocking the support means against vertical movement or inducing vertical movement of selected ones of the support means, whereby the tool may be pitched or tilted.

19. A vehicle for moving material, having plural wheels, and having:

a suspension system therefor consisting of hydraulic suspensions including front and rear fluid-operated means, said means comprising at least two fluid actuator mechanisms disposed one on each of the opposite sides of the vehicle at one end of the vehicle, and included in the suspensions at that end and connecting the wheels to that end of the vehicle for extensible and retractive movement of the suspensions and wheels from and into an intermediate position between extreme vertically displaced positions;

fluid spring means to cushion such movement;

fluid under pressure supply means;

adjustable control valves communicating with the supply means;

first circuit means including wheel valve devices and hydraulically connecting the fluid spring means and the adjustable control valves to the fluid actuator mechanisms;

motion-transmitting means responsive to the relative position of the fluid actuator mechanisms for controlling the flow of fluid through the first circuit means;

manually positioned control means communicating with the supply means and actuable for extending, retracting, or fixing the position of the suspensions and wheels; and second circuit means including the wheel valve devices and hydraulically connecting the manually positioned control means and the respective fluid actuator mechanisms to actuate the suspensions and wheels in the described manner independently from and into any position;

said wheel valve devices having a first position affording communication through the first circuit means only, to cause the suspensions to maintain the vehicle in a cushioned, automatically leveled suspension condition, and having a second position affording communication through the second circuit means and interrupting the first circuit means, to cause the suspensions to rigidly position the vehicle from and into various tilted and pitched attitudes and preventing the cushioned, automatically leveled suspension condition;

20. In a dual condition suspension for a vehicle of the class described, in combination with the supported and plural supporting structures of the vehicle: a plurality of hydraulically positioned articulating mechanisms operatively connecting said structures whereby a plurality of the supporting structures are displaced independently of one another relative to the supported structure of the vehicle; said mechanisms having first positioning means therefor which are operative during a first condition of the suspension and which include communications between yieldable, expansible chamber means and the individual hydraulically positioned articulating mechanisms for handling the ingress and egress of hydraulic fluid from the yieldable, expansible chamber means to and from the individual hydraulically positioned articulating mechanisms so as to impart cushioning action in said first condition; said first positioning means further including leveling control means hydraulically connected to said communications and connected by motion-transmitting means to the supporting structures so as to be responsive to vertical displacement of the supporting structures from an intermediate position, for replenishingly and exhaustively controlling hydraulic fluid of a hydraulic source to and from the individual hydraulically positioned articulating mechanisms, in a direction restoring the supporting structures to their intermediate position to impart leveling action to the supported structure; and second means operative during a second condition of the suspension, comprising valve means in the communications between the expansible chamber and leveling control means and the articulating mechanisms to prevent such cushioning action and leveling action.

21. The invention according to claim 20, wherein said yieldable, expansible chamber means consist of closed accumulators charged with gas for yieldingly reacting to absorb shock loads transmitted through the supporting structures during the first condition of the suspension.

22. In a dual condition suspension means for a vehicle of the class described, in combination with the supported and supporting structures of the vehicle: a plurality of hydraulically positioned articulating mechanisms operatively connecting said structures whereby a plurality of the supporting structures has movement in a vertical direction independently to one another relative to the supported structure of the vehicle; said mechanisms having first positioning means therefor which are operative during a first condition of the suspension, and which include yieldable, expansible chamber means, and fluid communications between said means and mechanisms for handling the ingress and egress of the fluid of the yieldable, expansible chamber means to and from the individual hydraulically positioned articulating mechanisms, so as to impart cushioning action to such vertical movement in said first condition; and second means operative during a second condition of the suspension, including valve means in said commuications from the expansible chamber means, to prevent such cushioning action and cause the articulating mechanisms to be held in their respective positions without movement.

23. In a vehicle having sources of fluid under pressure:

a supported frame and suspension means carried thereby in engagement with the ground;

said suspension means comprising wheels and a plurality of positionable hydraulic members in frontwardly and rearwardly disposed dispositions and each carrying a wheel at the extremity;

the rearwardly disposed members of said suspension means maintaining engagement with the ground so as to establish a transverse and a longitudinal pivotal axis;

means comprising a plurality of movable leveling valves providing separate first connections between a source of the fluid and each hydraulic member;

motion transmitting means engaging the leveling valves and connected to said members to move the leveling valves, in directions for supplying and exhausting fluid to and from said members to restore them from displaced positions of vertical movement to an intermediate undisplaced position, thus automatically establishing a neutral position of the supported frame;

accumulators to cushion such movement, said first connections hydraulically interconnecting said accumulators and said hydraulic members;

means comprising a plurality of manually controlled separate connections between a source of the fluid and the frontwardly disposed members; and a plurality of wheel valves in the connections between said source and the leveling valves;

each of said wheel valves being movable from a first position in the first connections to a second position therein preventing the cushioning action of the accumulators and blocking the leveling valves from said members, so as to enable the manually controlled connections to independently supply and exhaust fluid through said separate connections to and from the frontwardly disposed members for causing relative movement between the frontwardly disposed members and the frame in directions about the transverse and longitudinal pivotal axes aforesaid.

24. The invention according to claim 23 comprising gas charged accumulators individual to said members;

said wheel valves in their first position connecting said accumulators and said members for cushioning the supported frame, and hydraulically blocking said accumulators from the members in the second position of said wheel valves;

said wheel valves each having means to bias the valve in a direction toward one of said positions, each wheel valve having a fluid pressure chamber at one end, and presenting a longitudinally acting pressure area at that end acting in response to the fluid pressure to move the valve in a direction toward the other position.

25. In a ground vehicle:
a supported frame therefor;
a plurality of suspension means connected to the frame comprising hydraulic positioning members arranged at the sides of the vehicle by pairs, in respective front and rear dispositions and carrying wheels at their outer extremity;
a source having hydraulic fluid lines connected to the hydraulic members;
leveling valves connected to respond to movement of the hydraulic members from an undisplaced neutral position and hydraulically connected in the lines to control flow of hydraulic fluid in the lines from said source to and from the hydraulic members, in a direction to restore said members automatically to the neutral position;
wheel valves connected in said lines between said leveling valves and hydraulic members, movable from a first position to a blocking position to block the hydraulic fluid flow and terminate the aforesaid effectiveness of said leveling valves;
front connections to the respective wheel valves associated with the front pair of hydraulic members and rear connections to the wheel valves associated with the rear pair of hydraulic members;
fluid-under-pressure supply lines for supplying hydraulic fluid to operator-operated valves;
operator-operated control valves connected to the front connections operative in blocking position of the wheel valves to control flow of hydraulic fluid; said operator-operated control valves being in communication with said supply lines, and controlling the flow of hydraulic fluid of said lines to and from the wheel valves associated with the front pair of hydraulic members for causing independent movement of each member of the front pair; and
a cross-over connected between said rear connections affording hydraulic linking between the members of said rear pair so as to cause forced downward movement of either rear member upon upward movement of the other rear member, thereby accommodating to tilting of the frame about a longitudinal axis.

26. The invention according to claim 25, said leveling valves being effective in the described first position of said wheel valves and comprising a first valve connected to the front hydraulic member on one side of the vehicle so that the valve takes a position of displacement corresponding to the position of displacement of that front member;
a second valve connected to the front hydraulic member on the other side so that the valve takes a position of displacement corresponding to the position of displacement of that front member; and
valve means connected to the rear pair of hydraulic members so that the just said valve means take a position of displacement corresponding to the position of displacement of the rear members, said valve means being collectively operative with the first and second valves in the described first position of said wheel valves to maintain the vehicle frame substantially parallel to the ground.

27. In a vehicle:
supported structure having suspension means carried thereby;
said suspension means comprising a plurality of wheel-assembly hydraulic devices disposed at the front and rear of the vehicle for raising and lowering wheel assemblies into and from a neutral position of vertical movement in supporting said structure;
hydro-pneumatic spring accumulators individual to the front and rear wheel-assembly hydraulic devices to cushion such vertical movement;
individual means comprising a wheel valve and a line providing a connection between each hydraulic device and the associated hydro-pneumatic spring accumulator to provide cushioning action as aforesaid;
centralized accumulator means for holding fluid under regulated pressure and having a communication to said lines between the wheel valves and the associated hydro-pneumatic spring accumulators;
a plurality of leveling valves in said communications and connected by means of motion-transmitting means to different ones of said wheel assemblies, said leveling valves being responsive to movement of the wheel assemblies from a neutral position and operative with a leveling action to control fluid between the centralized accumulator means and the lines to the wheel valves, in a direction for automatically restoring the wheel assemblies to neutral position;
said wheel valves having a blocking position blocking the hydraulic devices from the flow of fluid in said lines and said communications to prevent the cushioning and leveling actions aforesaid;
supply conduits having a source and leading therefrom to the hydraulic devices; and
operator-operated valves connected in said supply conduits and, when the wheel valves are in the blocking position, operative selectively to hydraulically lock the front hydraulic devices or to replenishingly and exhaustively control fluid flow in the supply conduits from said source to and from the front hydraulic devices for raising and lowering the front wheel assemblies about the rear wheel assemblies and about a fore-and-aft axis of the vehicle to pitch and tilt said supported structure.

28. In a dual condition suspension for a ground vehicle having a hydraulic source with lines for leading pressure fluid therefrom:
supported structure;
ground traversing supporting units in front and rear dispositions connected in supporting relation to the supported structure, each comprising hydraulic actuator means communicating with said lines, and articulating means moved realtive to the supported structure by the hydraulic actuator means to raise and lower front and rear portions of the supported structure relative to the corresponding front and rear supporting units;
yieldable means having first connections to the hydraulic actuator means to provide a cushioning action during vertical oscillation of the suspension about a neutral position during a sprung condition of the suspension;
a cross-over line having second connections to the hydraulic actuator means of the rear supporting units;
sprung-unsprung valve means in said first and second connections to the hydraulic actuator means shiftable from a sprung position corresponding to the sprung condition of the suspension to an unsprung position blocking the first connections to prevent such cushioning action, but affording cross-over flow in the second connections for floating the rear supporting units relative to one another whereby displacement of either rear unit in a vertical direction displaces the other rear unit in the opposite vertical direction in the unsprung condition of the suspension; and
raise-hold-lower valve means connected in said lines for replenishingly and exhaustively controlling fluid flow of said hydraulic source individually to and from the hydraulic actuator means of the front units, said raise-hold-lower valve means being operative during the unsprung suspension condition for independently moving the front portions of the supported structure.

29. In a vehicle comprising a supported chassis frame, a plurality of ground-traversing assemblies pivotally attached to the chassis frame, hydraulic members connected between the frame and the assemblies, and a supply of hydraulic fluid having dual lines for supplying fluid under pressure to the hydraulic members, said lines having a common portion therefrom leading to the hydraulic members;

the combination with said assemblies, hydraulic members, and lines leading thereto, of automatic first valve means, in one of said lines, connected to said assemblies to respond to displacement of said assemblies into pivotally raised and lowered positions to increase and decrease the fluid pressure supplied to the members, in a manner to restore said assemblies to an undisplaced position;

operator-operated second valve means in the other of said lines operable to increase and decrease the fluid pressure supplied to said members for displacing said assemblies to raise and lower the vehicle; and selective valve mechanism connected in said common portion of the lines common to the first and second valve means for selective interposition to render either valve means ineffective while affording operation of the other, whereby the vehicle automatically seeks an attitude parallel to the ground, or takes an attitude under the dictates of the operator with different portions raised or lowered from the parallel attitude aforesaid.

30. In a self-powered, instrumentality-carrying vehicle:

a vehicle body for supporting a heavy instrumentality which is carried by the vehicle;

a frame rigid with the body;

ground-traversing devices shiftably mounted to the frame at the sides of the vehicle including a pair of opposed hydraulic-positioned front end suspension members and a pair of opposed hydraulic-positioned rear end suspension members providing fluid knee action between the vehicle and the ground; and a crossover;

the opposed hydraulic-positioned suspension members of that pair which is at one end of the frame being hydraulically interconnected by said crossover affording free lateral oscillation of the aforesaid one end of the frame, so that an amount of displacement of one member of the pair in a vertical direction forces the other member of the pair in the opposite vertical direction by that amount, for accommodating to movement of the vehicle into different attitudes of tilt relative to the ground.

31. For use, in carrying upon a transport body, a heavy instrumentality which is to be transported:

a wheeled vehicle of which the vehicle frame is at all times rigid with the body;

sets of front and rear wheels;

lockable hydraulic means individual to the wheels and shiftably and independently connecting the wheels to the frame;

a plurality of yielding devices carried by the vehicle and connected to the lockable hydraulic means for cushioning the latter to afford a springing condition of said means when unlocked;

a plurality of lock devices connected to the lockable hydraulic means for locking same to fix the attitude of the vehicle relative of the ground; and a unitary locking and unlocking control common to the plurality of lock devices and movable between an unsprung position locking the lockable hydraulic means and a sprung position unlocking and restoring said means to the springing condition.

References Cited by the Examiner

UNITED STATES PATENTS

| | | | |
|---|---|---|---|
| 1,680,555 | 8/1928 | Lair. | |
| 2,076,523 | 4/1937 | Ballack et al. | |
| 2,312,389 | 3/1943 | Cordes | 37—124 |
| 2,312,390 | 3/1943 | Cordes | 37—123 |
| 2,812,954 | 11/1957 | Lyon | 280—124 |
| 2,843,396 | 7/1958 | Lucien. | |
| 2,849,225 | 8/1958 | Lucien. | |
| 2,860,715 | 11/1958 | Bouffort | 180—9.2 |
| 2,869,892 | 1/1959 | Sahagian | 280—124 |
| 2,885,202 | 5/1959 | Trumper. | |
| 2,978,254 | 4/1961 | Bundorf | 267—64 |
| 3,003,783 | 10/1961 | Brueder | 280—124 |
| 3,047,283 | 7/1962 | Kivell. | |
| 3,063,510 | 11/1962 | Hunger. | |

ABRAHAM G. STONE, *Primary Examiner.*

R. A. DOUGLAS, ROBERT C. RIORDON, BENJAMIN HERSH, BENJAMIN BENDETTE, *Examiners.*

A. J. BECK, W. B. STONE, G. T. MOLLER, F. B. HENRY, *Assistant Examiners.*